US008184589B2

(12) United States Patent
Lee et al.

(10) Patent No.: US 8,184,589 B2
(45) Date of Patent: May 22, 2012

(54) APPARATUS AND METHOD FOR CONTROLLING LAYER 3 HANDOVER OF MOBILE NODE

(75) Inventors: Ki-Cheol Lee, Yongin-si (KR); Kee-Sung Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1058 days.

(21) Appl. No.: 11/802,909

(22) Filed: May 25, 2007

(65) Prior Publication Data
US 2007/0275726 A1 Nov. 29, 2007

(30) Foreign Application Priority Data

May 25, 2006 (KR) .................. 10-2006-0047252
Mar. 27, 2007 (KR) .................. 10-2007-0029899

(51) Int. Cl.
*H04W 4/00* (2009.01)
(52) U.S. Cl. ......... 370/331; 370/328; 370/338; 455/436
(58) Field of Classification Search .............. 370/331, 370/252, 310.2, 328, 338; 455/336–444
See application file for complete search history.

(56) References Cited

U.S. PATENT DOCUMENTS

| | | | |
|---|---|---|---|
| 6,947,401 B2 * | 9/2005 | El-Malki et al. ............. | 370/331 |
| 2003/0087646 A1 * | 5/2003 | Funato et al. .............. | 455/456 |
| 2003/0179731 A1 * | 9/2003 | Noguchi et al. ............. | 370/331 |
| 2004/0192307 A1 | 9/2004 | Watanabe et al. | |
| 2004/0218566 A1 | 11/2004 | Han | |
| 2005/0036471 A1 * | 2/2005 | Singh et al. ............... | 370/338 |
| 2005/0088993 A1 * | 4/2005 | Jung et al. ................ | 370/331 |
| 2005/0163080 A1 * | 7/2005 | Suh et al. ................. | 370/331 |

FOREIGN PATENT DOCUMENTS

| | | |
|---|---|---|
| WO | 2004089005 | 10/2004 |
| WO | WO 2004/089005 | 10/2004 |

OTHER PUBLICATIONS

European Search Report corresponding to European Patent Application 07010057.3, issued on Nov. 22, 2007.
Internet Draft by Liebsch, et al., entitled "Candidate Access Router Discovery"; draft-ietf-seamoby-card-protocol-08.txt; IETF Standard-Working-Draft, Internet Engineering Task Force, IETF, CH, vol. seamoby, No. 8, published in Sep. 2004.
Office Action issued Mar. 12, 2010 by the State Intellectual Property Office of the People's Republic of China for related Chinese Patent Application No. 200710146454.X.
European Patent Office Search Report dated Jun. 9, 2010 in related European Application No. 07 010 057.3.

* cited by examiner

*Primary Examiner* — Kent Chang
*Assistant Examiner* — San Htun
(74) *Attorney, Agent, or Firm* — H.C. Park & Associates, PLC

(57) ABSTRACT

A system and method for controlling layer 3 (L3) handover of a mobile node is disclosed. A mobile Internet protocol (MIP) network includes a plurality of mobile nodes, a plurality of users, a plurality of routers, and a handover control system. The plurality of routers periodically report state information of a plurality of base stations and the plurality of routers to a handover control system, which receives the state information to produce a handover topology map and maps a current location of the plurality of mobile nodes to the handover topology map to search for a plurality of target routers having a highest probability of handover. The handover control system transmits the state information of the searched target routers to the mobile nodes. Thus, the L3 handover time can be shortened to tens of ms or less, allowing for seamless real-time multimedia service even though a terminal moves.

20 Claims, 22 Drawing Sheets

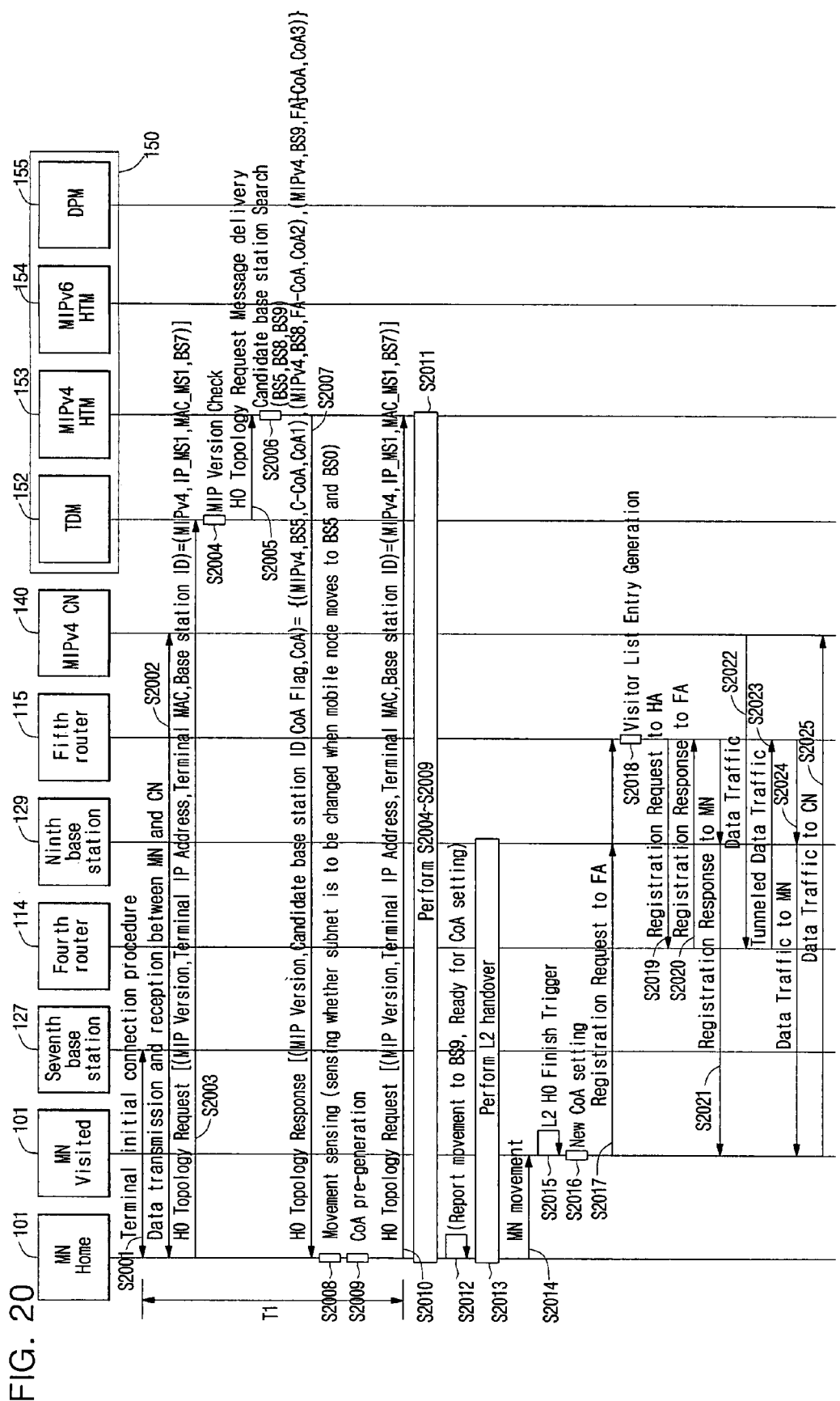

FIG. 21
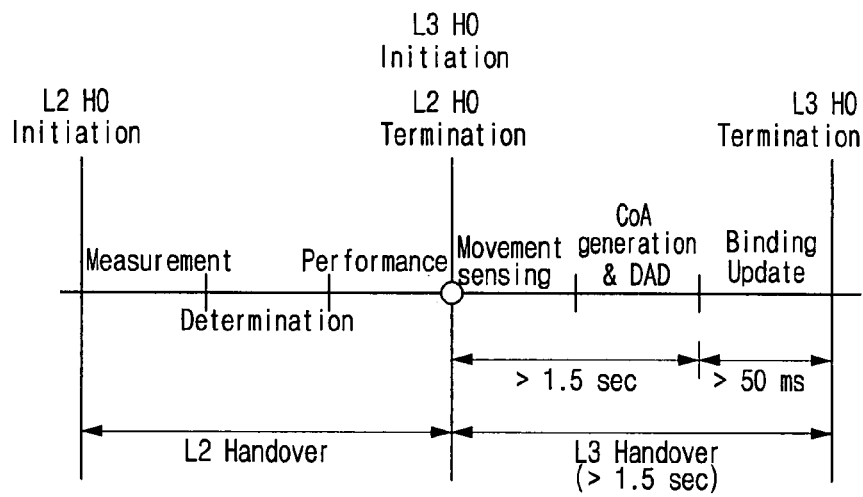
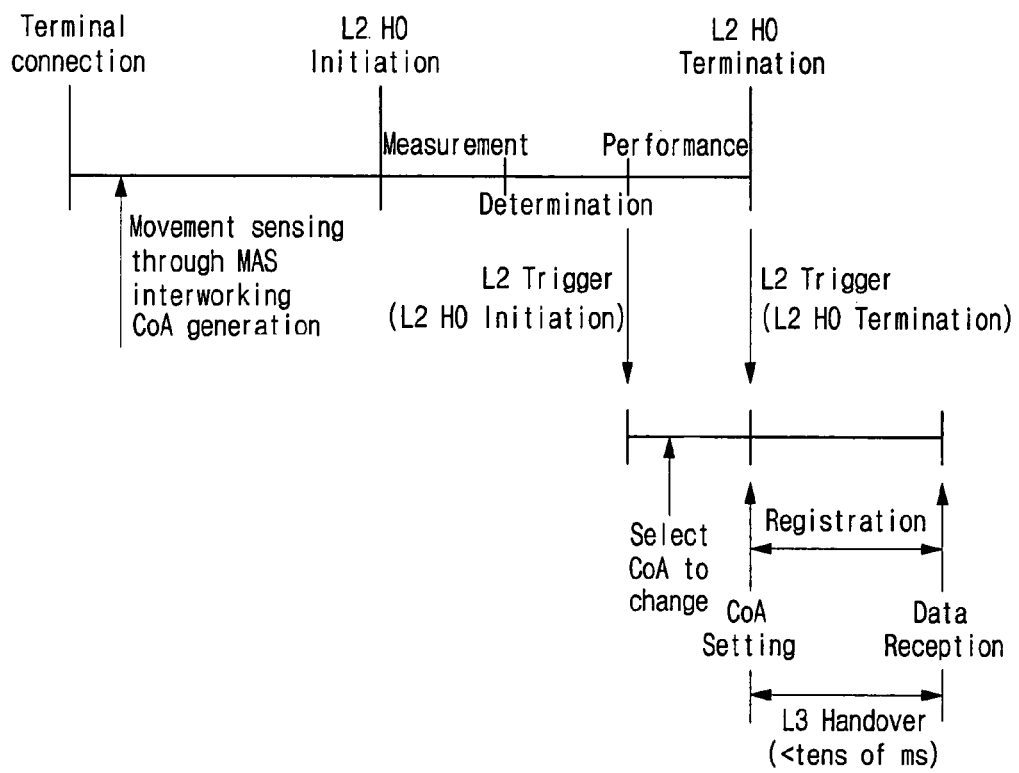

APPARATUS AND METHOD FOR CONTROLLING LAYER 3 HANDOVER OF MOBILE NODE

CLAIM OF PRIORITY

This application makes reference to, incorporates the same herein, and claims all benefits accruing under 35 U.S.C. §119 from an application for Apparatus and Method for Controlling Layer 3 Handover of Mobile Node filed in the Korean Intellectual Property Office on 25 May 2006 and there duly assigned Serial No. 2006-47252, and an application for Apparatus and Method for Controlling Layer 3 Handover of Mobile Node filed on 27 Mar. 2007 and there duly assigned Serial No. 2007-29899.

BACKGROUND OF THE INVENTION

1. Field of the Invention

The present invention relates to a system and method for controlling layer 3 (L3) handover of a mobile node.

2. Description of the Related Art

At present, the Internet is based on Internet protocol version 4 (IPv4). In IPv4, a source incorporates a source address and a destination address into a packet in order to transmit the packet to a destination via the Internet. An IP address used in IPv4 consists of 32 bits, which allows about 4 billion hosts to connect to the Internet. However, due to special address use, subnetting, network address allocation, and the like, the number of hosts that can actually connect to the Internet is more limited. Furthermore, with the spread of the Internet and increase in multimedia traffic, mobile communication terminals, customer information appliances, and the like, as well as computers, have been adapted to connect to the Internet. There are a great number of customer information appliances, including mobile communication terminals, televisions, and refrigerators, that cannot all connect to the Internet due to insufficient availability of IPv4 addresses. To overcome the problem of insufficient available IP addresses and to achieve high-performance Internet by making IPv4 more efficient, IPv6 technology has been developed.

Internet protocol version 6 (IPv6) is based on a 128-bit address system and provides fluent IP addresses in comparison with the 32-bit IPv4. Since the 128-bit address system increases the amount of content in a routing table that a router uses to determine a route, time taken to search for a suitable route can increase. Fortunately, the time taken to search for a route in a routing table can be shortened by having more layers in the IPv6 address system than in the IPv4 address system.

With the advanced IPv6, high-performance Internet capable of coping with rapidly increasing Internet traffic and spread of multimedia traffic can be provided. Meanwhile, IP addresses allocated to hosts consist of a network identifier and a host identifier. The network identifier is unique information for identifying a network to which hosts are connected, and the host identifier is unique information for identifying a host in the network. The host allocated the IP address generates a socket address using the IP address and a port number of a transfer layer and establishes a connection with other hosts using the socket address.

Once one host (a first host) is connected to another host (a second host), an IP address of the first host should be kept unchanged while the connection is maintained. When the first host connected to the second host moves to another network in a mobile environment, the network identifier must be changed. This changes the IP address allocated to the first host. Since the IP address change leads to change in a socket address, the existing connection is released. Accordingly, re-connection must be attempted.

To solve the problem of the connection release caused by a host's movement to another network, the Internet Engineering Task Force (IETF) proposes mobile IPv6 (hereinafter, referred to as "MIPv6") protocol. MIPv6 protocol allows an existing connection to be maintained even though a mobile node (MN) moves to another network. In other words, MIPv6 protocol provides a mechanism for enabling a connection with another host ("correspondent node (CN)") on the Internet to be kept unchanged even though a mobile node on the Internet connected to the correspondent node moves to another place.

Meanwhile, developments in communication technology include the building of wireless networks such as a cellular network, a wireless LAN, a Wibro network, and the like. The wireless network allows users to use various multimedia services, such as voice over Internet protocol (VoIP), video phone, IP-TV, and video on demand (VoD), in a wireless environment. However, if a serving base station is changed due to a user's movement in the wireless environment, service can be blocked. Accordingly, handover technology is required to provide seamless service even when users move. A handover can be classified into a layer 2 (L2) handover and a layer 3 (L3) handover. The L2 handover occurs when a user moves to another base station, and the L3 handover occurs when a user moves to another IP subnet. The L2 handover is performed by a cellular network, a wireless LAN, and a Wibro network, and the L3 handover is performed through the above mobile IP (MIP), which is for using the same IP address allocated to a user.

A MIPv6 network includes a home agent (HA), an MIPv6 mobile node, a number of routers, base stations, and a correspondent node (CN). The mobile node is a sort of terminal for enabling a user to receive Internet service, and the routers relay a packet to the mobile node. The home agent manages an address of the mobile node, and the correspondent node is an arbitrary host on the Internet that provides multimedia service to the mobile node. A handover occurs when the mobile node moves to another base station.

In describing a handover process in an MIPv6 network, it is assumed that the mobile node moves from the second base station belonging to the home agent to the third base station belonging to the second router. First, the mobile node in a coverage area of the first router serving as the home agent transmits and receives data to and from the correspondent node. If a user of the mobile node moves from the coverage area of the first router to a coverage area of the second router, the mobile node senses the movement to the second base station. Here, the mobile node, when moving into the coverage area of the second router, senses the movement in an L3 state through old access reachability check.

After recognizing the necessity of L3 handover, the mobile node transmits a router solicitation (RS) message to the second router. Upon receipt of the RS message, the second router generates a router advertisement (RA) message including its own prefix information and the like and transmits it to the mobile node. In response to the router advertisement message, the mobile node extracts the prefix information and generates a care-of-address by itself (CoA).

The mobile node transmits a binding update (BU) message to the home agent to report the care-of-address generated previously. The home agent registers the care-of-address contained in the binding update message with its own database and responds by transmitting a binding update acknowledgment message to the mobile node.

After the binding update procedure is performed, the correspondent node still transmits data to the mobile node via the home agent. The home agent encapsulates the data from the correspondent node into a new care-of-address of the mobile node and tunnels it to the mobile node.

Meanwhile, the mobile node can transmit data to the correspondent node via the second router. However, the mobile node performs a binding update process with the correspondent node for router optimization to remove the tunneling process. This binding update process is performed through the exchange of the binding update message and the binding update acknowledgement message. After the binding update, the mobile node communicates data with the correspondent node directly, not via the home agent.

The L3 handover process includes a movement sensing process, a care-of-address generation process, and a binding update process. The movement sensing process takes 300 ms, and the care-of-address generation process takes about 1 second. Finally, the binding update process takes 10 ms.

In MIPv6, the L3 handover occurs after the L2 handover as described above, and the L3 handover can take 1.3 seconds or more. Thus, it is necessary to reduce the care-of-address generation time, which is about 1 second and accounts for most of the time taken to perform a handover.

SUMMARY OF THE INVENTION

It is therefore an aim of the present invention to provide a handover control system and method for enabling faster handover of a mobile node by searching in advance for a router to which the mobile node is likely to move and generating a care-of-address (CoA) through combination of an address of the router with an address of the mobile node.

According to one aspect of the present invention, there is provided a mobile Internet protocol (MIP) network that includes a plurality of mobile nodes adapted to provide data service to a plurality of users and a plurality of routers and a handover control system, the plurality of routers being adapted to provide data service to ones of the plurality of mobile nodes in coverage areas of a plurality of base stations managed by the plurality of routers, and to periodically report state information of the plurality of base stations and the plurality of routers to a handover control system, the handover control system being adapted to receive the state information of the plurality of base stations and the plurality of routers to produce a handover topology map, to map a current location of ones of the plurality of mobile nodes to the handover topology map to search for a plurality of target routers having a highest probability of handover of ones of the plurality of mobile nodes, and to transmit the state information of the searched plurality of target routers to the ones of the plurality of mobile nodes.

According to another aspect of the present invention, there is provided a handover control system that includes a topology discovery module adapted to collect topology information of a plurality of routers and a plurality of base stations and a handover management module adapted to generate a handover topology map using the topology information of the plurality of base stations and the plurality of routers, to map a current location of a plurality of mobile nodes to the handover topology map to search for a plurality of target routers having a highest probability of handover of ones of the plurality of mobile nodes, and to transmit state information of the searched plurality of target routers to the plurality of mobile nodes.

The system can also include a handover topology table including at least one element selected from a group consisting of IDs of the plurality of routers, interface information of the plurality of routers, prefix of the plurality of routers, IDs of the plurality of base stations belonging to the respective ones of the plurality of routers, location information of the plurality of base stations, and coverage information of the plurality of base stations. The system can also include a care-of-address table including at least one element selected from a group consisting of Media Access Control (MAC) Addresses of the plurality of mobile nodes, IDs of the plurality of base stations having a highest probability of handover of ones of the plurality of mobile nodes, candidate care-of-addresses, collided care-of-addresses, and entry expiration times. The handover management module can be further adapted to transmit a plurality of topology response messages to the plurality of mobile nodes in response to topology request messages to request information on the plurality of target routers and the plurality of base stations having a highest probability of handover of ones of the plurality of mobile nodes, the plurality of topology response messages include IDs of the plurality of target routers, candidate care-of-addresses, and candidate care-of-address duplicate information. The system can also include a duplicate-address detection (DAD) process module adapted to request the ones of the plurality of target routers to check whether the candidate care-of-addresses are duplicates. The system can also be adapted to generate a handover topology map for each mobile Internet protocol (MIP) version supported by ones of the plurality of base stations. The handover management module can be farther adapted to check the MIP version supported by ones of the plurality of mobile nodes, and to map a current location of ones of the plurality of mobile nodes to the handover topology map corresponding to the MIP version supported by the ones of the plurality of mobile nodes to search for the plurality of target routers.

According to yet another aspect of the present invention, there is provided a router that includes a network interface module adapted to communicate with a plurality of network elements over an IP network, a topology information collecting module adapted to collect topology information of a plurality of base stations managed by the router and a duplicate-address check module adapted to transmit, via the network interface module, a neighbor solicitation message including candidate care-of-address information to the plurality of base stations managed by the router, and to determine whether the candidate care-of-address information is a duplicate based on whether a neighbor advertisement message is received as a response to the neighbor solicitation message. The duplicate-address check module can be further adapted to determine that the candidate care-of-address information is a duplicate upon the neighbor advertisement message being received. The router can also include a candidate care-of-address table adapted to store at least one element selected from a group consisting of care-of-address entry IDs, candidate care-of-addresses, and expiration times.

According to yet another aspect of the present invention, there is provided a mobile node that includes a handover topology requesting unit adapted to request from a handover control system information on candidate care-of-addresses and on a plurality of target routers having a highest probability of handover of ones of a plurality of mobile nodes, an layer 2 (L2) trigger sensing unit adapted to sense termination of L2 handover as ones of the plurality of mobiles node moves to ones of the plurality of target routers and a care-of-address (CoA) setting unit adapted to set IP addresses of ones of the plurality of mobile nodes to the candidate care-of-addresses received from the handover control system upon the L2 trigger sensing unit sensing the termination of the L2 handover.

The mobile node can also include a binding updating unit adapted to perform binding update with a correspondent node after the IP addresses are set to the candidate care-of-addresses. The handover topology requesting unit can be further adapted to transmit a desired mobile Internet protocol (MIP) version to the handover control system upon the requesting information on the plurality of target routers and the candidate care-of-addresses.

According to still another aspect of the present invention, there is provided a method that includes producing a handover topology map by a handover control system, based on state information of a plurality of routers and a plurality of base stations belonging to ones of the plurality of routers, requesting the handover control system to provide information on a plurality of target routers having a highest probability of handover of ones of the plurality of mobile nodes, mapping, by the handover control system, a current location of ones of the plurality of mobile nodes to the handover topology map to search for the plurality of target routers having a highest probability of handover of ones of the plurality of mobile nodes and transmitting state information of the searched target routers to ones of the plurality of mobile nodes.

The state information of the plurality of routers can be one of IDs of the plurality of routers, interface information of the plurality of routers, prefix of the plurality of routers, IDs of the plurality of base stations belonging to respective ones of the plurality of routers, location information of the plurality of base stations, and coverage information of the plurality of base stations, the mapping by the handover control system, a current location of ones of the plurality of mobile nodes to the handover topology map to search for the plurality of target routers having a highest probability of handover of ones of the plurality of mobile nodes, and transmitting state information of the searched plurality of target routers to the plurality of mobile nodes includes combining prefix information of the plurality of target routers with Media Access Control (MAC) addresses of the plurality of mobile nodes to generate candidate care-of-addresses and transmitting the generated candidate care-of-addresses to the plurality of mobile nodes. The method can also include performing, by the plurality of mobile nodes, layer 2 (L2) handover and then setting their respective IP addresses to the candidate care-of-addresses received from the handover control system. The method can also include generating, by the handover control system, the candidate care-of-addresses and checking whether the candidate care-of-addresses are duplicates with respect to the searched plurality of target routers. The handover control system, the candidate care-of-addresses and the checking whether the candidate care-of-addresses are duplicates with respect to the searched plurality of target routers can include sending, by the handover control system, a duplicate-address detection (DAD) request message including the candidate care-of-addresses to each of the plurality of target routers transmitting, by each of the plurality of target routers, a neighbor solicitation message for the candidate care-of-address to a plurality of base stations belonging ones of the plurality of routers and checking, by the plurality of target routers, whether the candidate care-of-addresses are duplicates based on whether neighbor advertisement messages are received from the plurality of base stations. The checking, by the plurality of target routers, whether the candidate care-of-addresses are duplicates based on whether neighbor advertisement messages are received from the plurality of base stations includes determining, by the target router, that the candidate care-of-addresses are duplicates upon the neighbor advertisement messages being received during a period of time. The method can also include combining, by ones of the plurality of target routers, a prefix of the ones of the plurality of target routers to an arbitrary IP address to regenerate the candidate care-of-addresses again and to send these regenerated candidate care-of-addresses to the handover control system upon the candidate care-of-addresses being duplicates. The receiving, by a handover control system, state information of the plurality of routers and the plurality of base stations belonging to ones of the plurality of routers to produce a handover topology map includes generating a handover topology map indicating coverage areas of the plurality of base stations for each mobile Internet protocol (MIP) version. The searching for the plurality of target routers includes checking an MIP version supported by ones of the plurality of mobile nodes and a current location of ones of the plurality of mobile nodes and mapping the current location of ones of the plurality of mobile nodes to a handover topology map corresponding to the MIP version supported by the plurality of mobile nodes to search for the plurality of target routers.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein:

FIG. 20 is a flowchart illustrating a MIPv4 handover process using a handover control system according to still another exemplary embodiment of the present invention; and FIG. 21 illustrates a handover time in the handover control system according to still another exemplary embodiment of the present invention.

DETAILED DESCRIPTION OF THE INVENTION

Figure 1:
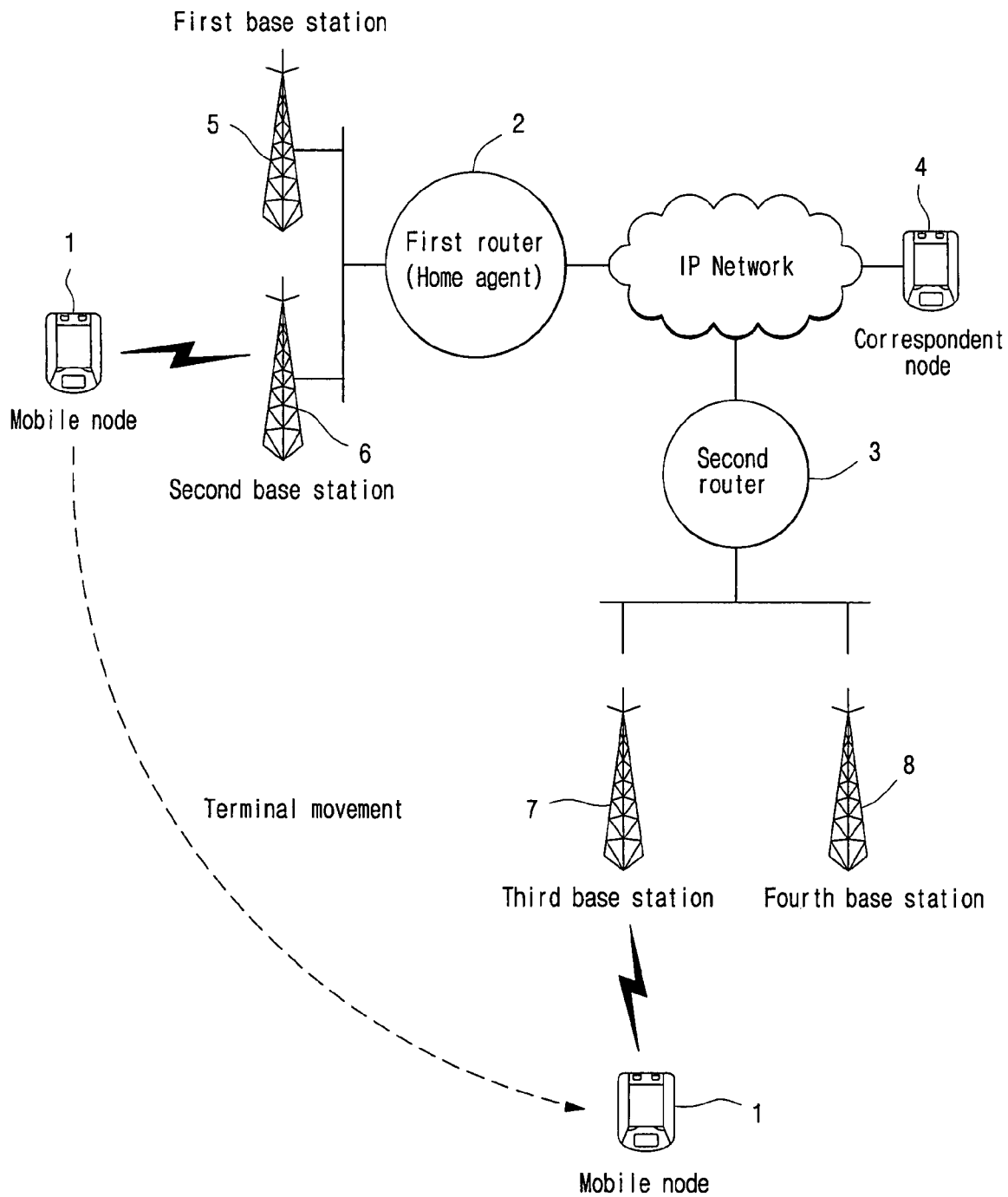
FIG. 1 is a block diagram illustrating a MIPv6 network.

Turning now to FIG. 1, FIG. 1 is a block diagram illustrating an MIPv6 network. Referring to FIG. 1, the MIPv6 network includes a home agent (HA) 2, an MIPv6 mobile node 1, a number of routers 2 and 3, base stations 5 through 8, and a correspondent node (CN) 4. The mobile node 1 is a sort of terminal for enabling a user to receive Internet service, and the routers 2 and 3 relay a packet to the mobile node 1. The home agent 2 manages an address of the mobile node 1, and the correspondent node 4 is an arbitrary host on the Internet that provides multimedia services to the mobile node. As shown in FIG. 1, handover occurs when the mobile node 1 moves to another base station.

Figure 2:
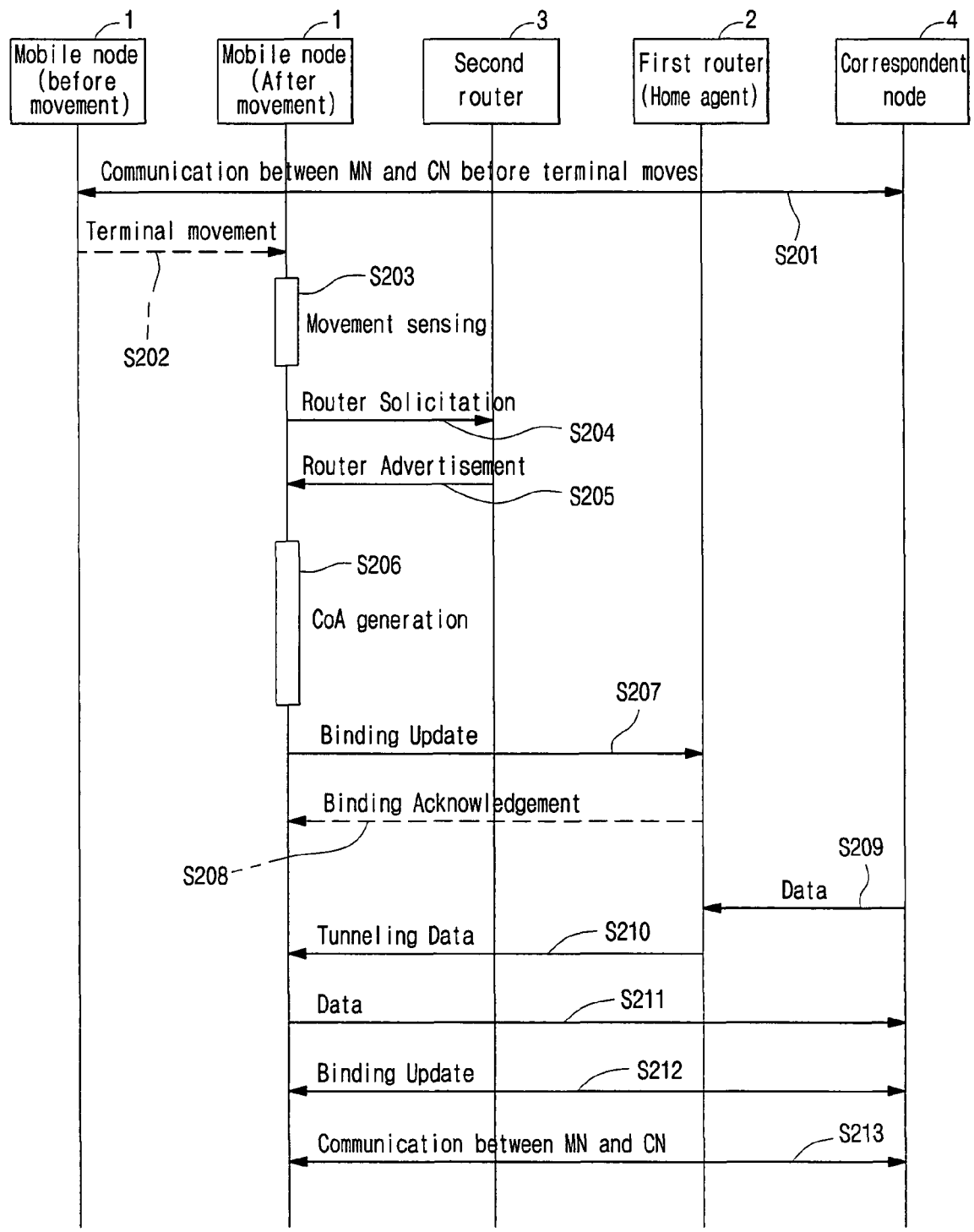
FIG. 2 is a flowchart illustrating a handover process in a MIPv6 network.

Turning now to FIG. 2, FIG. 2 is a flowchart illustrating a handover process in an MIPv6 network. It is assumed that the mobile node 1 moves from the second base station 6 belonging to the home agent 2 to the third base station 7 belonging to the second router 3.

First, the mobile node 1 in a coverage area of the first router 2 serving as the home agent transmits and receives data to and from the correspondent node 4 (S201). If a user of the mobile node 1 moves from the coverage area of the first router 2 to a coverage area of the second router 3 (S202), the mobile node 1 senses the movement to the third base station 7 (S203). Here, the mobile node 1, when moving into the coverage area of the second router 3, senses the movement in an L3 state through old access reachability check.

After recognizing the necessity of L3 handover, the mobile node 1 transmits a router solicitation (RS) message to the second router 3 (S204). Upon receipt of the RS message, the second router 3 generates a router advertisement (RA) message including its own prefix information and the like and transmits it to the mobile node 1 (S205). In response to the router advertisement message, the mobile node 1 extracts the prefix information and generates a care-of-address by itself (CoA) (S206).

The mobile node 1 transmits a binding update (BU) message to the home agent 2 to report the care-of-address generated in S206 (S207). The home agent 2 registers the care-of-address contained in the binding update message with its own database and responds by transmitting a binding update acknowledgment message to the mobile node 1 (S208).

After the binding update procedure (S207 and S208) is performed, the correspondent node 4 still transmits data to the mobile node 1 via the home agent 2 (S209). The home agent 2 encapsulates the data from the correspondent node 4 into a new care-of-address of the mobile node 1 and tunnels it to the mobile node 1 (S210).

Meanwhile, the mobile node 1 can transmit data to the correspondent node 4 via the second router 3 (S211). However, the mobile node 1 performs a binding update process with the correspondent node 4 for router optimization to remove the tunneling process of S210 (S212). This binding update process is performed through the exchange of the binding update message of S207 and the binding update acknowledgement message of S208. After the binding update, the mobile node 1 communicates data with the correspondent node 4 directly, not via the home agent 2 (S213).

Figure 3:
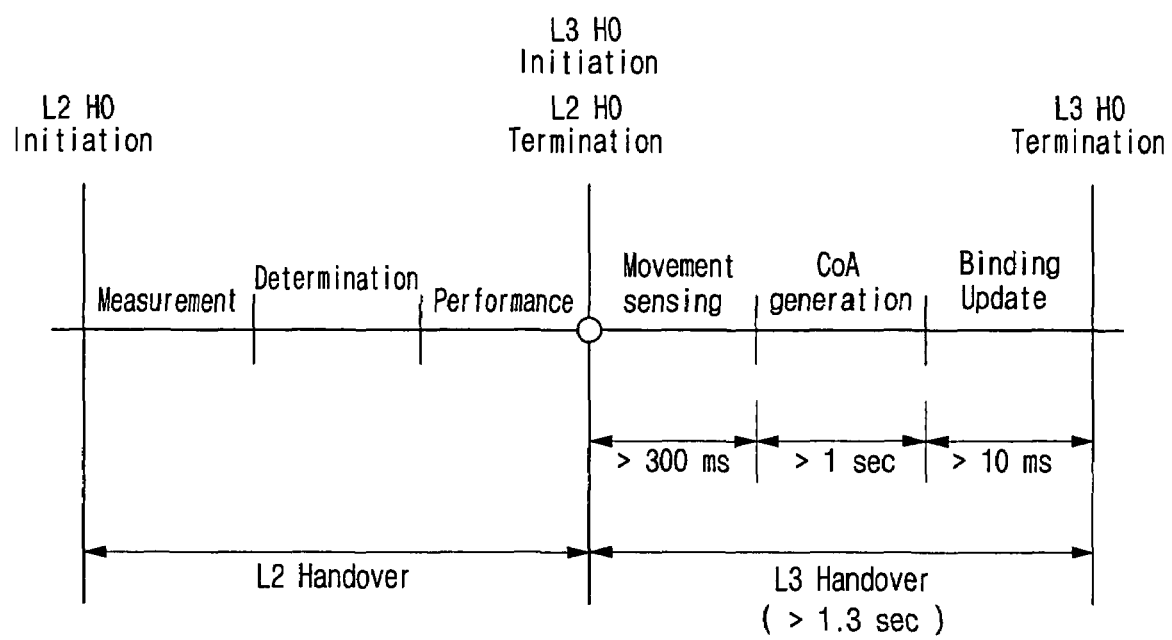
FIG. 3 illustrates a handover time in the MIPv6 network of FIG. 2.

FIG. 3 illustrates time taken to perform the handover process in the MIPv6 network of FIG. 2. Referring to FIG. 3, the L3 handover process includes a movement sensing process, a care-of-address generation process, and a binding update process. The movement sensing process takes 300 ms, and the care-of-address generation process takes about 1 second. Finally, the binding update process takes 10 ms.

In MIPv6, the L3 handover occurs after the L2 handover as described above, and the L3 handover can take 1.3 seconds or more. Thus, it is necessary to reduce the care-of-address generation time, which is about 1 second and accounts for most of the time taken to perform a handover.

Figure 4:
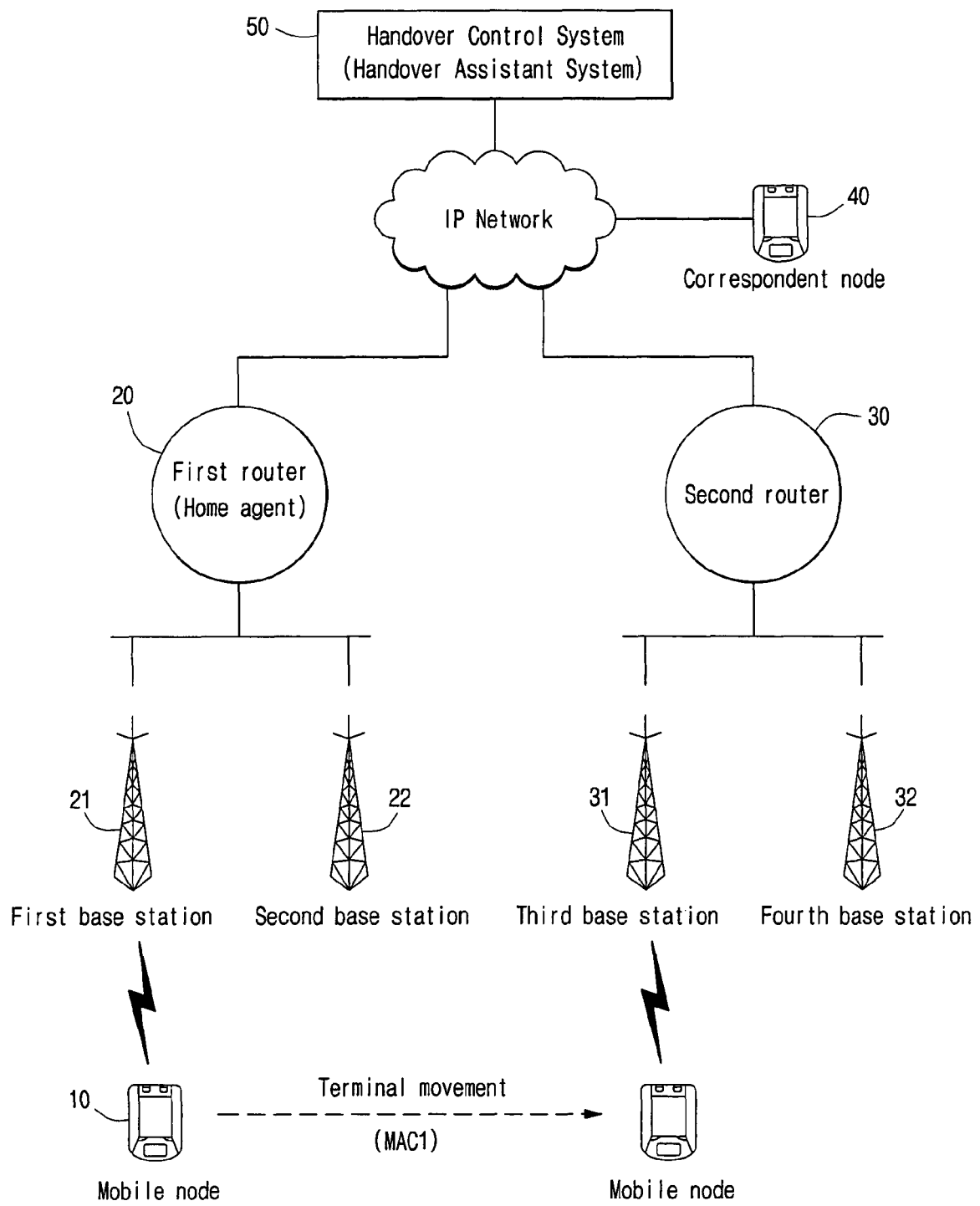
FIG. 4 is a block diagram illustrating an MIPv6 network according to an exemplary embodiment of the present invention.

FIG. 4 is a block diagram illustrating an MIPv6 network according to an exemplary embodiment of the present invention. Referring to FIG. 4, the MIPv6 network can include an IP network including an L2 switch and an L3 switch, a first router 20 serving as a home agent, a second router 30, a number of wireless base stations 21, 22, 31, and 32, a mobile node 10, a correspondent node 40, and a handover control system 50.

Here, the topology of any components shown except the handover control system 50 can be modified. For example, the home agent 20 can be disposed at a different position than shown in FIG. 4. Since basic operation of the router, the base station, the mobile node and the correspondent node shown in FIG. 4 is similar to in the MIPv6 network of FIG. 1, a description thereof will be omitted.

Figure 5:
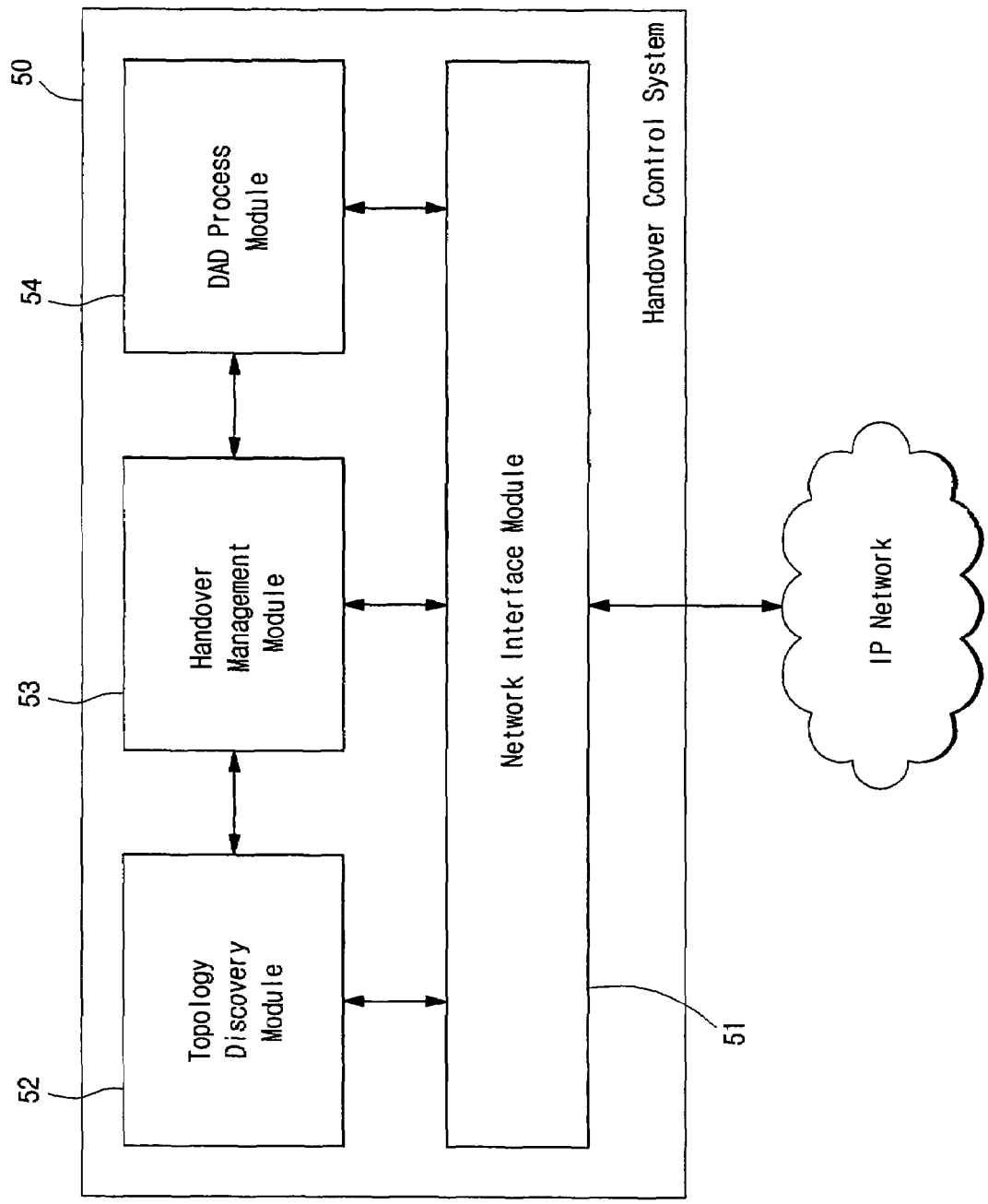
FIG. 5 is a block diagram illustrating the handover control system of FIG. 4 according to an embodiment of the present invention.

FIG. 5 is a block diagram illustrating a handover control system 40 of the network of FIG. 4 according to an embodiment of the present invention. The handover control system 50 can comprise a network interface module (NIM) 51, a topology discovery module (TDM) 52, a handover management module (HMM) 53, and a duplicate-address detection (DAD) process module (DPM) 54. The network interface module 51 performs a connection with network equipment. The network interface module 51 can issue a control command to the network equipment using protocols such as SNMP, CLI, TCP/IP, and the like, and transmit and receive data to and from the network equipment. The topology discovery module 52 serves to collect and manage topology information of an IP network and a wireless network. The topology discovery module 52 can obtain the topology information by communicating with the network equipment via the network interface module 51. The topology discovery module 52 can store and manage the information in a separate network topology table (not shown).

The handover management module 53 builds and manages a topology for the handover of the mobile node 10, and the DAD process module 54 performs a DAD process procedure to check whether the care-of-address pre-generated by the mobile node 10 is a duplicate. However, the purpose of the present invention is to reduce a handover time by pre-generating the care-of-address. The DAD process module 54 is a component for reducing the handover time more efficiently and is not essential.

Operation of the respective components on the MIPv6 network shown in FIG. 4 will now be described. The topology discovery module 52 periodically collects information for the first and second routers 20 and 30 and the base stations 21, 22, 31 and 32 through a protocol, such as SNMP, of the network interface module 51. The topology discovery module 52 can collect a topology of the IP network for network management purposes. After collecting the network topology in this manner, the topology discovery module 52 builds the network topology table and transmits only router and base station information related to the handover to the handover management module 53.

The handover management module 53 creates a handover topology table as shown in Table 1. As shown in Table 1, the handover topology table can include router information (router ID), router interface information (router Interface ID), IPv6 prefix information, base station ID, base station location, base station coverage information, and the like. Of course, the handover topology table can further include information included in a handover determination algorithm and the like. A data flow between the components in collecting the handover topology information will now be described.

node 10 is located, and search for an adjacent base station to which mobile node 10 is likely to move. Specifically, the handover control system 50 determines that adjacent base stations having an overlapping coverage with the base station where the mobile node 10 is located are base stations to which the mobile node 10 is likely to move, and provides information on each base station to the terminal. Further, since the network topology collecting procedure of the handover control system 50 is performed periodically, the handover control system 50 can update the handover topology map even though the network topology is modified. A handover topology map formulated by the handover management module 53 will now be described in greater detail.

Figure 7:
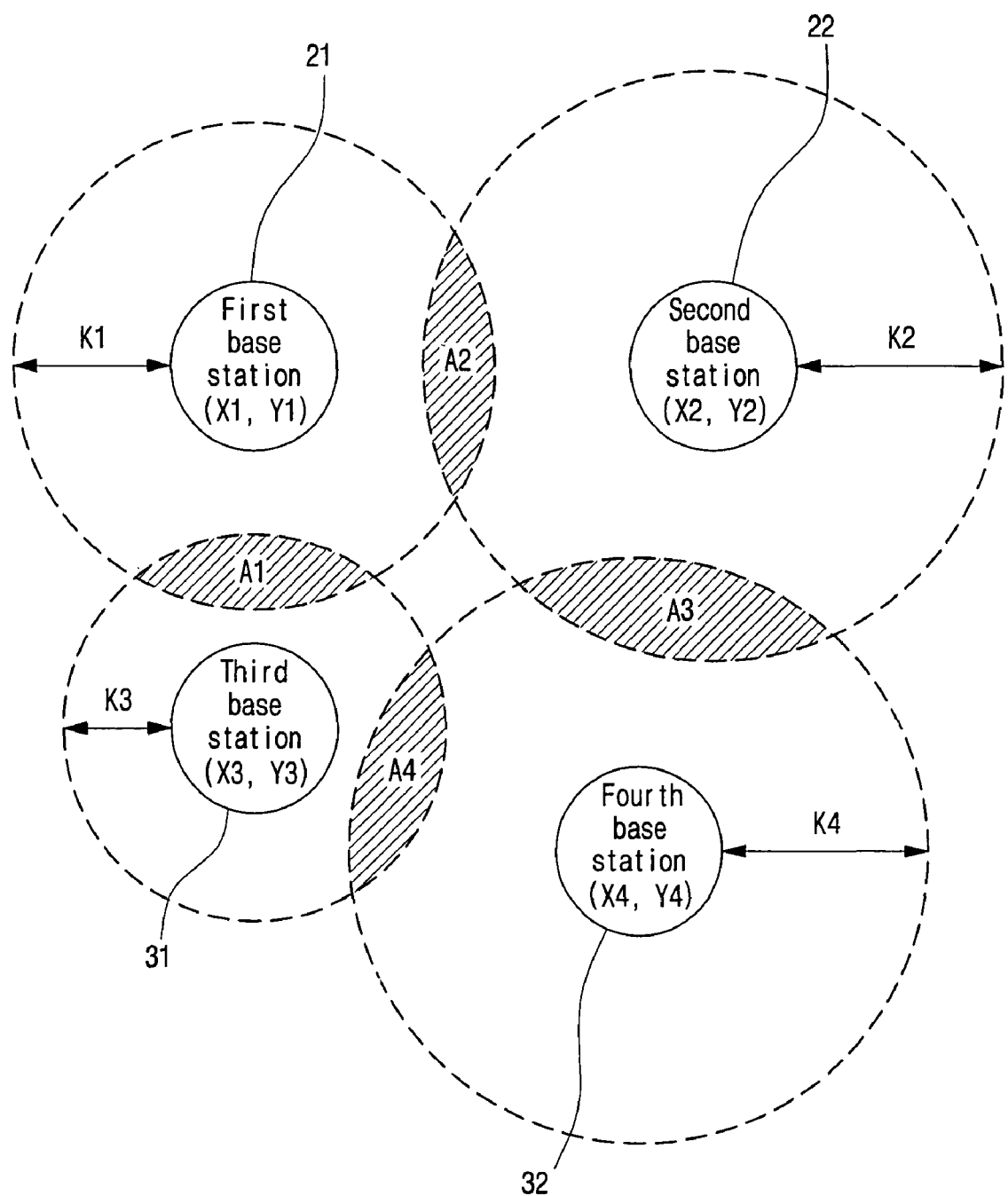
FIG. 7 illustrates a handover topology map managed by a handover management module according to the present invention.

FIG. 7 illustrates a handover topology map managed by a handover management module according to the present invention. The handover management module 53 of FIG. 5 plots the coverage area of each base station by referring to the base station ID, the location coordinates for each base station ID, and the coverage in Table 1. The handover topology map of FIG. 7 is obtained by plotting the coverage area of each base station.

For example, in order to plot a map for the first base station 21, the handover management module 53 recognizes the coordinate of the first base station 21 as (x1, y1). The handover management module 53 marks a point at a coordinate (x1, y1), and indicates that the point denotes the first base station 21.

TABLE 1

| Router ID | Interface ID | Prefix | Base station ID | Coordinates | Coverage | Others |
|---|---|---|---|---|---|---|
| Router 1 (HA) | if1 | pf1 | Base station 1 | (x1, y1) | K1 | — |
|  |  |  | Base station 2 | (x2, y2) | K2 | — |
| Router 2 (Visited) | if2 | pf2 | Base station 3 | (x3, y3) | K3 | — |
|  |  |  | Base station 4 | (x4, y4) | K4 | — |

Figure 6:
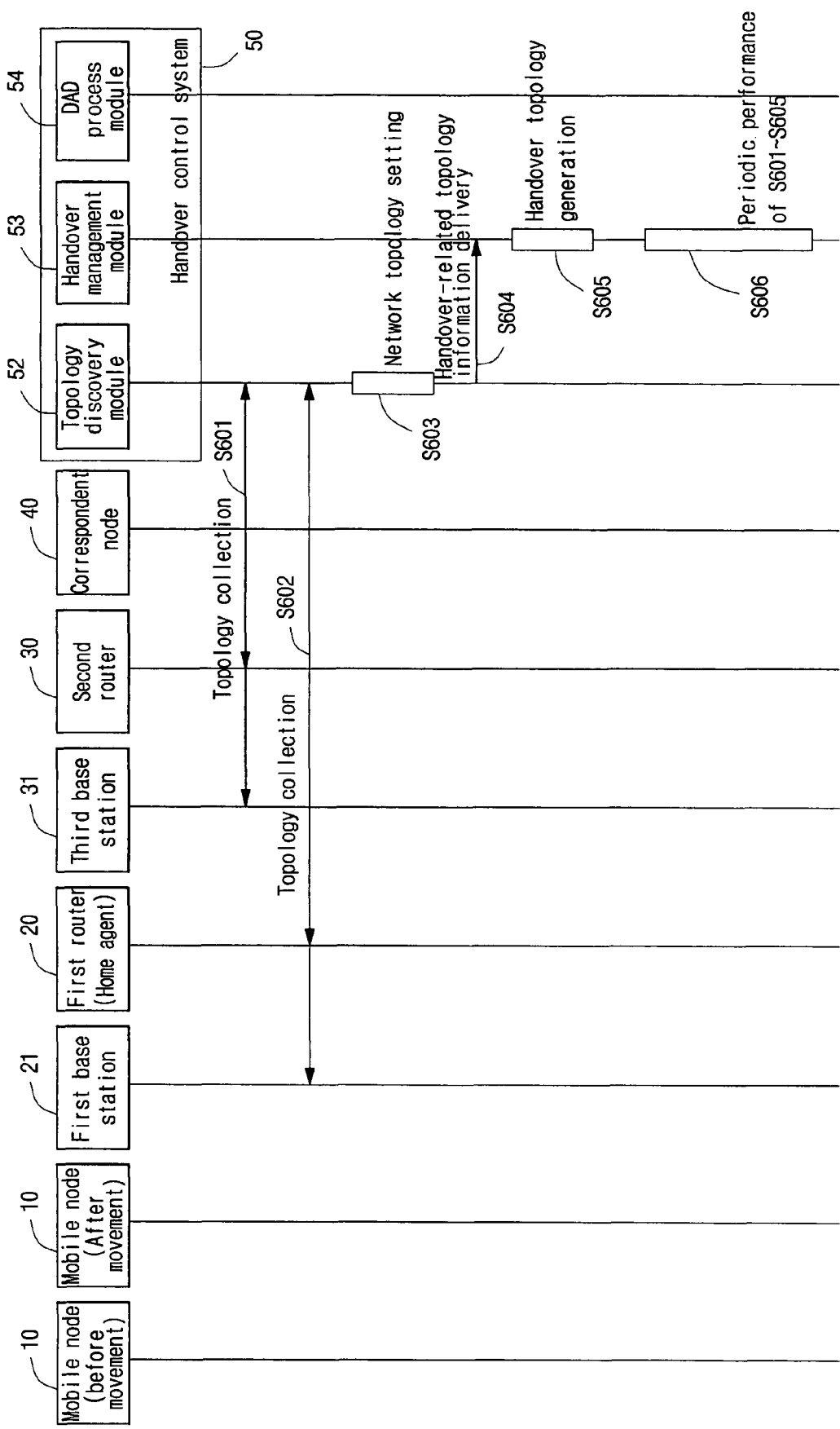
FIG. 6 is a flowchart illustrating a process of collecting handover topology information in the handover control system of the present invention.

FIG. 6 is a flowchart illustrating a process of collecting handover topology information in the handover control system of the present invention. The handover topology information collection of FIG. 6 is performed in advance by the handover control system 50 so that L3 handover due to movement of the mobile node 10 is performed in advance.

First, the topology discovery module 52 of the handover control system 50 collects topology information from a number of routers on the IP network (S601 and S602). In this case, the topology discovery module 52 can use protocols, such as SNMP, CLI, TCP/IP, and the like. The topology discovery module 52 can build the topology table for the entire network using the collected topology information (S603).

The topology discovery module 52 delivers handover-related topology information to the handover management module 53 of the handover control system 50 (S604). The handover-related information includes a router ID, a prefix, interface information, base station information, and the like. The handover management module 53 generates the handover topology table using the received handover topology information (S605).

The processes (S601 to S605) are not finished after only one iteration. Rather, to cope with a change in the topologies of the router, the base station and the like, the handover control system periodically performs the handover topology information collecting procedure (S606).

After building the handover topology table, the handover management module 53 formulates a handover topology map. The handover topology map includes location coordinates, coverage information, etc. of the base stations.

The handover topology map is used for the handover control system 50 to locate the base station where the mobile The handover management module 53 also checks that the coverage of the first base station 21 is K1. The handover management module 53 draws a circle with a radius of K1 around the coordinate (x1, y1) of the first base station 21 as its center. The handover management module 53 repeatedly performs the same task on the second, third, and fourth base stations 22, 31 and 32, resulting in a handover topology map shown in FIG. 7.

Using the handover topology map, the handover management module 53 can check an area to which the mobile node 10 is likely to move. For example, a shaded area A1 is an area where the mobile node 10 is likely to move from the first base station 21 to the third base station 31.

A method of simply formulating the handover topology map using the coordinates and coverage information of the base station has been described. However, the present invention is not limited to such a topology map formulation. The handover topology map can be formulated in consideration of information on ambient buildings, surroundings, and the like. The handover topology table of Table 1 can include such information, as mentioned previously.

Figure 8:
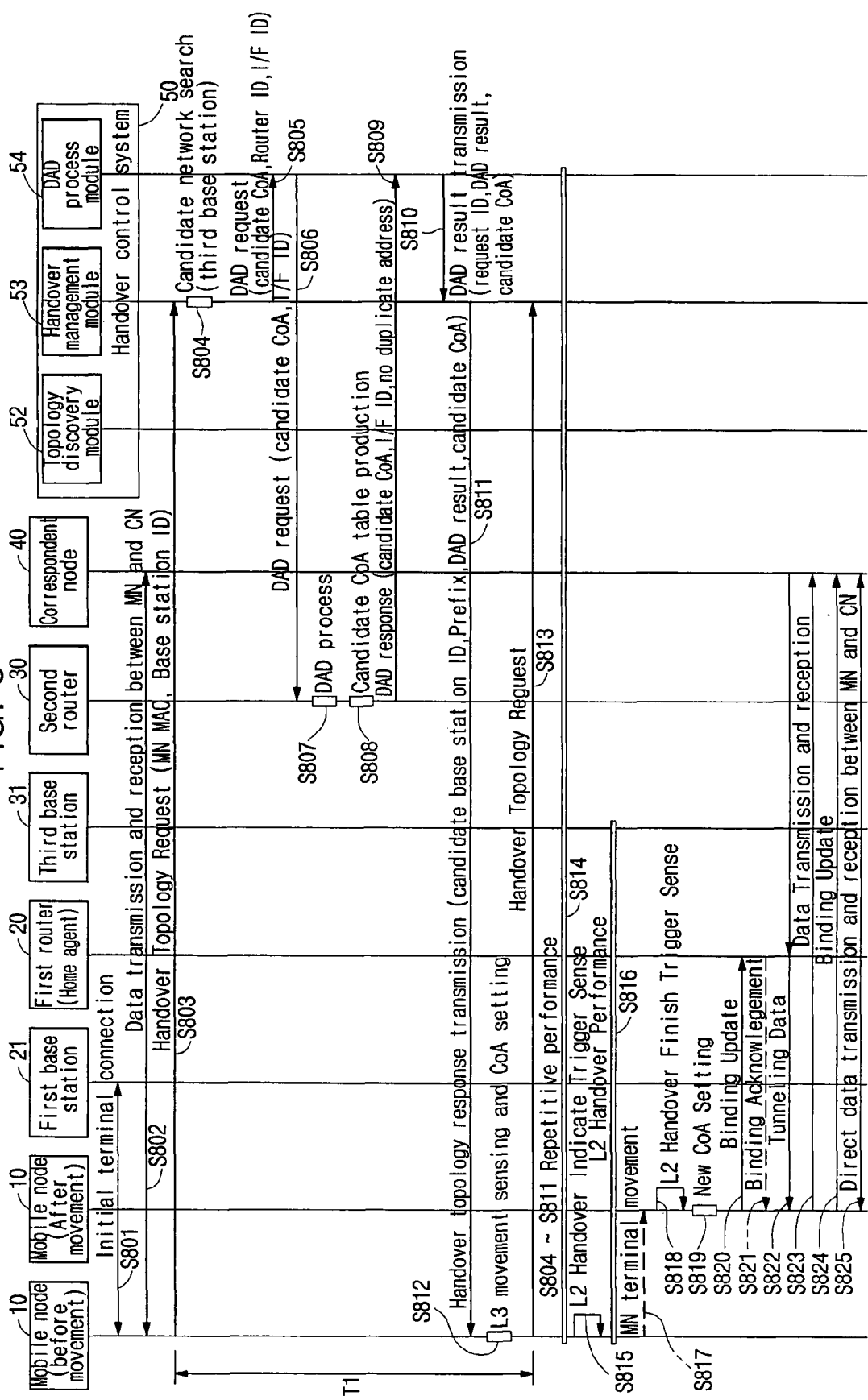
FIG. 8 is a flowchart illustrating a handover process using a handover control system according to still another exemplary embodiment of the present invention.

FIG. 8 is a flowchart illustrating a handover process using a handover control system according to still another exemplary embodiment of the present invention. The mobile node 10 of FIG. 4 performs an initial connection procedure with the first base station 21 (S801). When the connection is made, the mobile node 10 starts to transmit and receive data to and from the correspondent node 40 (S802). The mobile node 10 transmits a handover topology request message to the handover control system in order to obtain information on ambient base stations to which the mobile node 10 is likely to move, prefix information, and the like (S803). The handover topology request message includes a MAC address of the mobile node 10, an ID of a base station to which the mobile node 10 is connected, and the like.

Upon receipt of the handover topology request message, the handover management module 53 of the handover control system 50 recognizes a location of the mobile node 10 on the handover topology map as shown in FIG. 7, and searches for a candidate router to which the mobile node is likely to move (S804). The handover management module 53 extracts the prefix information of the base station, the router address for duplicate-address check, the interface information of the router, etc., from the handover topology table of Table 1.

For example, referring to the MIP network of FIG. 4, base stations to which handover of the mobile node 10 are likely are the second base station 22 and the third base station 31. However, if the mobile node 10 is in area A1 of FIG. 7, the handover management module 53 selects the third base station 31 as a candidate router. After selecting the candidate router, the handover management module 53 extracts the prefix information, etc. of the third base station 31.

Now, the handover management module 53 generates a candidate care-of-address, and requests the DAD process module 54 to check if the candidate care-of-address is a duplicate (S805). The handover management module 53 can combine the prefix of the searched router with the MAC address of the mobile node 10 to generate the candidate care-of-address. The handover management module 53 provides the candidate care-of-address (CoA) to be checked for duplication, an ID of a router for which the duplicate-address check is to be performed, and interface information (interface ID) of the router, and the like.

The DAD process module 54 then transmits a DAD request message to the router and the interface requested by the handover management module 53 (S806). The DAD request message includes the care-of-address (CoA) to be checked for duplication, interface information (I/F ID) of the router for which the duplicate-address check is to be performed, and the like.

In the example, the DAD processing module 54 transmits the DAD request message to the second router 30. In response to the DAD request message, the second router 30 performs a duplicate-address check process (S807). The duplicate-address check process will be described in greater detail with reference to FIG. 10.

After performing the duplicate-address check process, the second router 30 generates and updates a candidate care-of-address table (S808). The candidate care-of-address table allows the router to manage candidate care-of-addresses of mobile nodes that will move, and is composed as in Table 2:

TABLE 2

| CoA Entry ID | Candidate CoA | Expiration Time |
|---|---|---|
| 1 | pf1::X | t1 |
| 2 | pf2::Y | t2 |
| 3 | pf1::Z | t3 |
| 4 | pf3::K | t4 |
| 5 | pf4::P | t5 |
| 6 | pf3::H | t6 |

As shown in Table 2, the candidate care-of-address (CoA) table includes care-of-address entry IDs, candidate care-of-addresses, and expiration time. When a DAD request message for the care-of-address is not received within the expiration time, the DAD process module 54 deletes the care-of-address entry from the candidate care-of-address table. This is because the mobile node 10 is unlikely to move to the router as it moves to another place. Further, when an address of a mobile node to be newly connected is the same as the care-of-address in the candidate address table, the router deletes the care-of-address entry from the care-of-address table.

After the care-of-address table is updated through the above process, the second router 30 transmits a DAD response message to the DAD process module 54 of the handover control system 50 (S809). The DAD response message includes the candidate care-of-address, the router interface ID, and the duplicate-address check result.

In response to the DAD response message, the DAD process module 54 sends the DAD result to the handover management module 53 (S810). If a duplicate address is not discovered, the DAD process module 54 sends a DAD result including the DAD requesting ID and a flag indicating no duplicate address, etc to the handover management module 53. If a duplicate address is discovered, the DAD process module 54 sends a DAD result including the DAD requesting ID, a flag indicating presence of a duplicate address, the candidate care-of-address, and the like, to the handover management module 53.

Upon receipt of the DAD result, the handover management module 53 transmits a handover topology response message including an ID of the candidate base station, a prefix, a duplicate-address check result, a candidate care-of-address, and the like to the mobile node 10 (S811). According to the network of FIG. 4, the mobile node 10 recognizes from the handover topology response message that a base station to which the mobile node 10 can move is the third base station, the prefix of the connected router is pf2, and no terminals use an address of pf2:MAC1.

The mobile node 10 can perform movement sensing in advance to check whether L3 handover is required, since the prefix of the router to which the mobile node 10 is currently connected is pf1 and the prefix of the router connected with a base station to which the mobile node is likely to move to is pf2 (S812). The mobile node 10 can generate a care-of-address (CoA) of pf2::MAC1 in advance using the information included in the handover topology response message (S812). Since the duplicate-address check for this care-of-address is already completed, an additional duplicate-address check procedure is not required. This reduces time required for movement sensing, care-of-address generation, and duplicate-address check processes, unlike the MIPv6 of FIG. 1. Thus, the L3 handover time can be greatly shortened.

Even after performing the above processes, the mobile node 10 transmits the handover topology request message to the handover management module 53 in a predetermined period T1 (S813). This is for coping with changes in topology and preventing address collision through periodic duplicate-address checking.

A process in which the L3 handover is actually performed by the mobile node will now be described. The L2 of the mobile node 10 sends an L2 handover initiation trigger to the L3 and upper layers in order to indicate that the handover is initiated (S815). In response to the trigger, the mobile node 10 prepares the L3 handover. Entering the coverage area of the third base station 31, the mobile node 10 performs the L2 handover (S817). After the L2 handover is performed, the L2 of the mobile node 10 transmits an L2 handover finish trigger to the L3 and the upper layers (S818).

In response to the L2 handover finish trigger, the mobile node 10 sets its care-of-address (CoA) to pf2::MAC1 (S819) and transmits the binding update message to the home agent 20 (S820). Of course, the home agent 20 transmits the binding update acknowledgement message to the mobile node 10 in response to the binding update message (S821). Since the binding procedure between the mobile node 10 and the correspondent node 40 is not yet completed, data from the correspondent node 40 is encapsulated by the home agent 20 and tunneled to the mobile node 10 via a tunnel (S822).

Meanwhile, the mobile node 10 transmits data to the correspondent node 40 via the third base station (S823). After the mobile node 10 completes the binding procedure with the correspondent node 40 by transmitting the binding update message to the correspondent node 40 (S824), it can directly transmit and receive data to and from the correspondent node 40 (S825).

Figure 9:
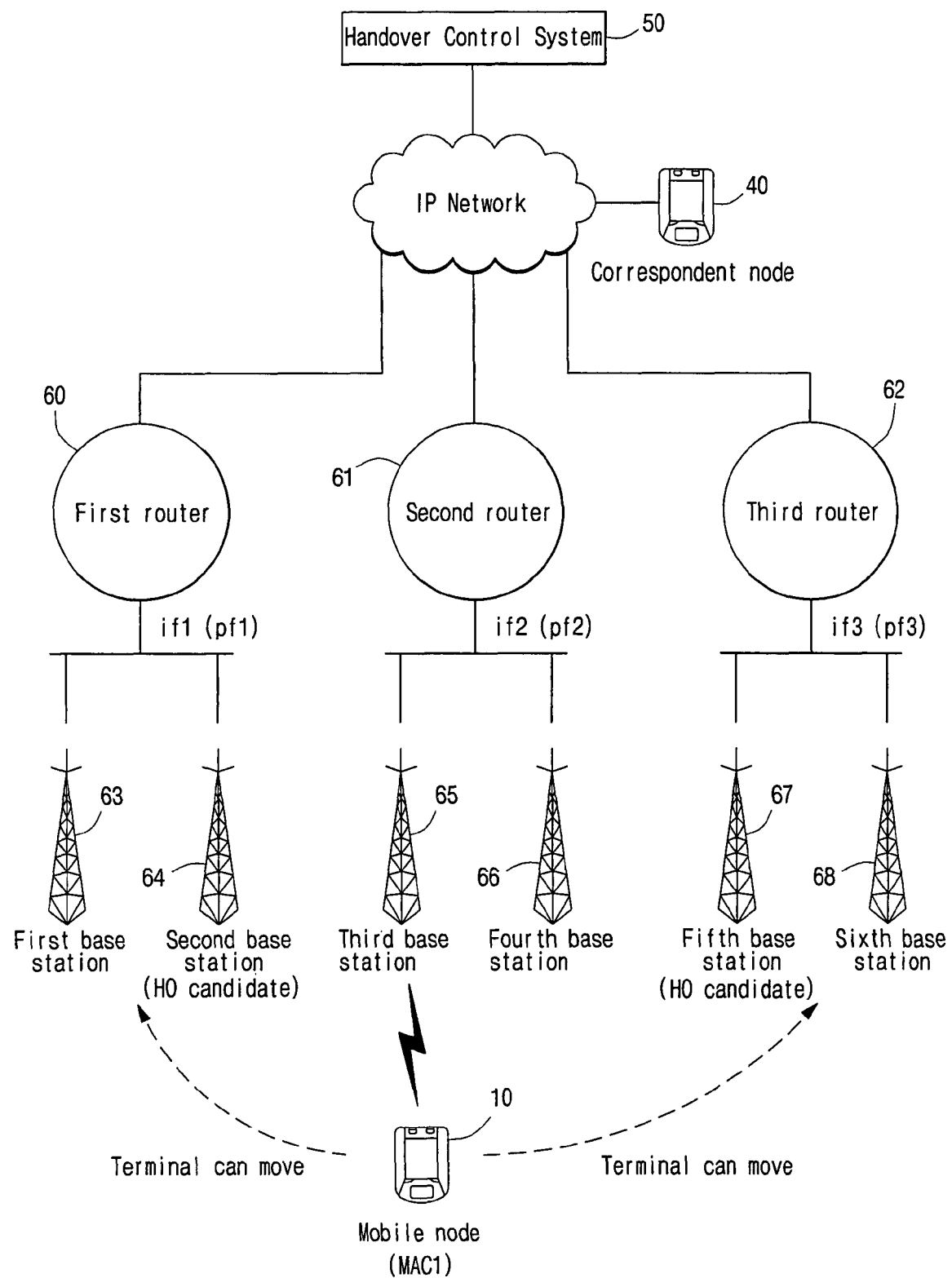
FIG. 9 is a block diagram illustrating a network for performing a duplicate-address check process according to still another exemplary embodiment of the present invention.

FIG. 9 is a block diagram illustrating a network for performing a duplicate-address check process according to still another exemplary embodiment of the present invention. The DAD process module 54 of FIG. 5 checks whether the candidate care-of-address generated by the handover management module 53 is a duplicate. The procedure of checking whether the candidate care-of-address is a duplicate will be described according to the network of FIG. 9.

The network of FIG. 9 comprises a handover control system 50, a correspondent node 40, a mobile node 10, first, second, and third routers 60 through 62, and base stations 63 through 68 belonging to the routers. In the present embodiment, it is assumed that the mobile node 10 is connected to the third base station 65 and is likely to move to the second base station 64 and the fifth base station 67 as a result of checking the handover topology.

Figure 10:
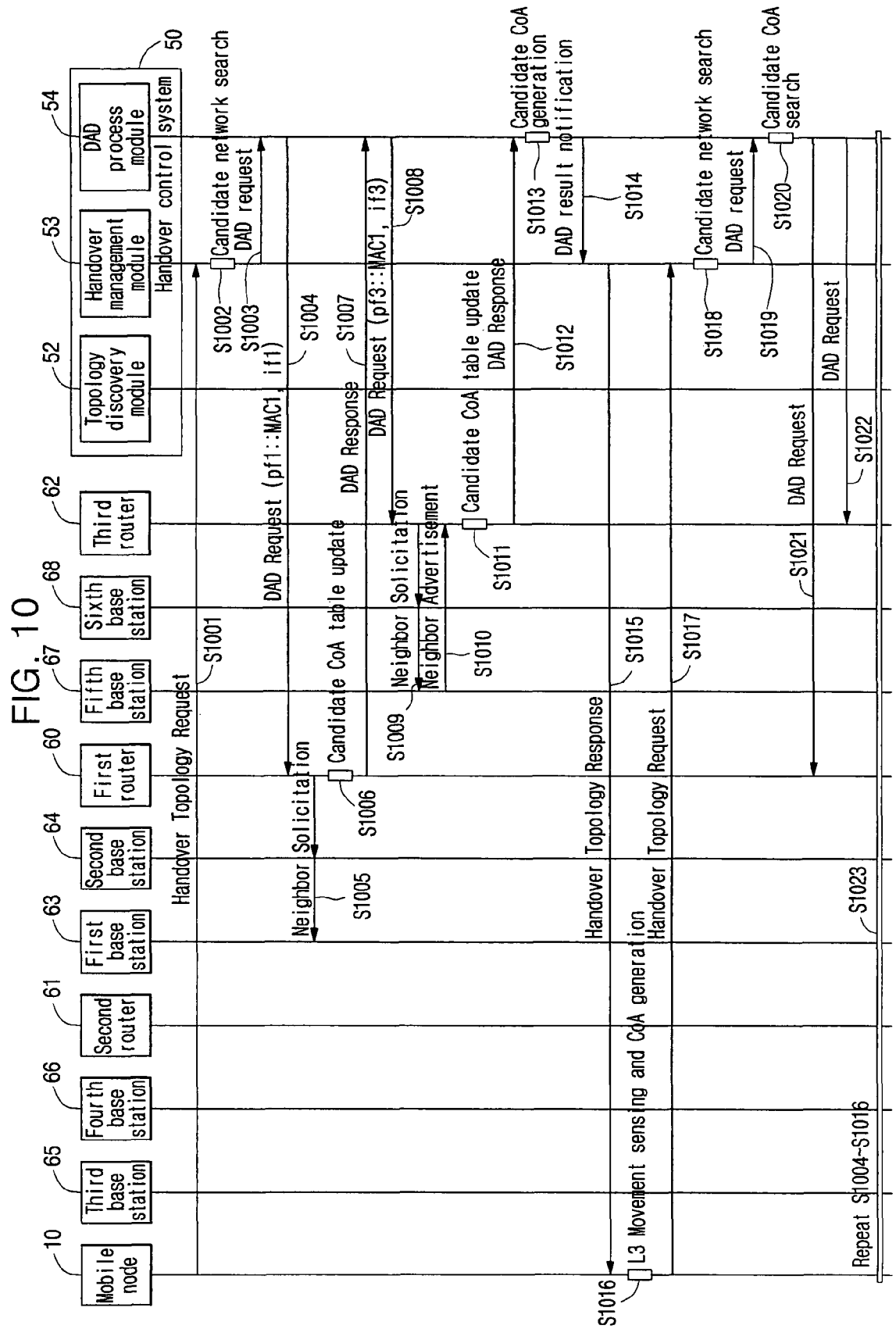
FIG. 10 is a flowchart illustrating a duplicate-address check process using a handover control system in the network of FIG. 9.

FIG. 10 is a flowchart illustrating a duplicate-address check process using a handover control system in the network of FIG. 9. Similar to process S803, the mobile node 10 transmits a handover topology request message to the handover management module 53 (S1001). The handover management module 53 searches for candidate routers to which the mobile node 10 is likely to move, from the handover topology table (S1002). Through this process, the handover management module 53 recognizes that the base stations to which the mobile node 10 is likely to move are the second base station 64 and the fifth base station 67. As described in process S805, the handover management module 53 generates the candidate care-of-address and requests the DAD process module 54 to check whether the candidate care-of-address is a duplicate (S1003). In this case, the handover management module 53 provides a candidate care-of-address, which is a combination of prefixes of candidate routers with a MAC Address of the mobile node 10, and router ID and interface information. In the present embodiment, the handover management module 53 provides [pf1::MAC1, router 1, if1] and [pf3::MAC1, router 3, if3]. The DAD process module 54 transmits a DAD request message to request the first and third routers 60 and 62 to check whether the candidate care-of-address is a duplicate (S 1004 and S1008).

First, the duplicate-address check procedure by the first router 60 is as follows. The first router 60 transmits a neighbor solicitation message to mobile nodes 10 connected to the first base station 63 and the second base station 64 (S1005). When a neighbor advertisement message is not received within a predetermined time, the first router 60 determines that there is no collision of the address pf1::MAC1 under its own interface. Accordingly, the first router 60 maintains the care-of-address entry of the candidate care-of-address table as is, and updates the expiration time (S1006). And, the first router 60 transmits a DAD response message to the DAD process module 54 in order to indicate pf1::MAC1, if1, and no duplicate address (S1007).

Similar to the first router 60, the third router 62 transmits a neighbor solicitation message to terminals connected to a fifth base station 67 and a sixth base station 68 (S1009). When a neighbor advertisement message is received from the fifth base station 67 (S1010), the third router 62 recognizes that there is a terminal using the address of pf3::MAC1 among terminals connected to the fifth base station 67. Accordingly, the third router 62 deletes the pf3::MAC1 entry from the candidate care-of-address table (S1011). The third router 62 then transmits a DAD response message to the DAD process module 54 in order to indicate pf3::MAC1, if3, and duplicate address (S1012).

Upon receipt of the message indicating the address collision, the DAD process module 54 determines the candidate care-of-address and adds it to the candidate care-of-address table in order to generate the care-of-address (CoA) of the mobile node 10 (S1013). In the above example, the DAD process module 54 determines pf1::MAC1 as the candidate care-of-address when the mobile node moves to the first router where there is no discovered duplicate address. On the other hand, when the mobile node moves to the third router where there is no discovered duplicate address, the DAD process module 54 can determine pf3::X as the candidate care-of-address.

Table 3 shows an example of a care-of-address table produced using the candidate care-of-address determined by the DAD process module 54.

TABLE 3

| Recommended CoA ID | MN MAC | Base station ID | Collided CoA | Recommended CoA | Expiration time |
| --- | --- | --- | --- | --- | --- |
| 1 | MAC1 | A1 | pf1::MAC1 | pf1::MAC1 | t1 |
| 2 | MAC2 | A3 | pf2::MAC2 | pf2::A | t2 |
| 3 | MAC3 | A5 | pf1::MAC3 | pf1::B | t3 |
| 4 | MAC1 | A6 | pf3::MAC1 | pf3::X | t4 |
| 5 | MAC5 | A5 | pf4::MAC5 | pf4::Y | t5 |
| 6 | MAC7 | A2 | pf3::MAC7 | pf3::Z | t6 |

As shown in Table 3, the candidate care-of-address table includes MAC addresses of mobile nodes, IDs of base stations to which the mobile nodes are likely to move, collided care-of-addresses, candidate care-of-addresses, and entry expiration time.

Upon receipt of the request for duplicate-address check from the handover management module 53, the DAD process module 54 returns the processing results of [request ID=the first router, DAD result=no duplicate address, candidate care-of-address=Null] and [request ID=the third router, DAD result=duplicate address, candidate care-of-address=pf3::X] to the handover management module 53 (S1014).

In response to the processing results, the handover management module 53 transmits a handover topology response message to the mobile node 10 in order to indicate [A2, pf1, no duplicate address, null] and [A5, pf3, duplicate address, pf3::X] (S1015). Upon receipt of the handover topology response message, the mobile node 10 generates pf1::MAC1 as the candidate care-of-address with respect to the second base station 64, and pf3::X recommended by the handover control system as the candidate care-of-address with respect to the fifth base station 67 (S1016). Through theses processes, the mobile node performs movement sensing and care-of-address generation in advance.

The candidate care-of-address pf3::X recommended by the DAD process module 54 of the handover control system 50 is not yet checked for address duplication. This can be solved as follows:

Similar to process S813, the mobile node 10 transmits a handover topology request message to the handover management module 53 in a period T1 (S1017). The handover management module 53 searches for the candidate base stations (S1018) and transmits the DAD processing request message to the DAD process module 54 (S1019). The DAD process module 54 searches for the candidate care-of-address from the candidate care-of-address table of Table 3 (S1020). Referring to the candidate care-of-address table, pf3::MAC1 is stored as the candidate care-of-address with respect to the first router 60 and pf3::X is stored as the candidate care-of-address with respect to the third router 62. The DAD process module 54 transmits a duplicate-address check request message to the first and third routers 60 and 62 to check whether pf3::MAC1 and pf3::X are duplicated (S1021 and S1022).

The DAD process module 54 receives the result of repeatedly performing the duplicate-address check process using the neighbor solicitation message and the corresponding response message, from the first and third routers 60 and 62, and transmits the result to the mobile node 10. Since these processes are the same as processes S1006, S1007, and S1009 to S1015 described above, a detailed description thereof will be omitted. Through this periodic process, the handover control system can check whether the arbitrarily generated pf3::X is a duplicate.

This duplicate-address check process can be performed by the mobile node 10 incorporating the candidate care-of-address into the handover topology request message. The handover management module 53 requests the DAD process module 54 to check whether the candidate care-of-address stored in the handover topology request message transmitted by the mobile node 10 is a duplicate. The DAD process module 54 checks whether the care-of-address is a duplicate. In this case, the DAD process module 54 does not have to check a mapping relationship between the address of the mobile node 10 and the candidate care-of-address from Table 3.

The processes S803 to S814 of FIG. 8 will be described in greater detail with reference to FIG. 10. If a request to check whether the care-of-address is a duplicate is not received from the handover management module 53 within the expiration time, the DAD process module 54 deletes the relevant entry.

A method for controlling the handover using the handover control system 50 according to the present invention has been described. A structure and operation of the router and the mobile node according to another aspect of the present invention will now be described.

Figure 11:
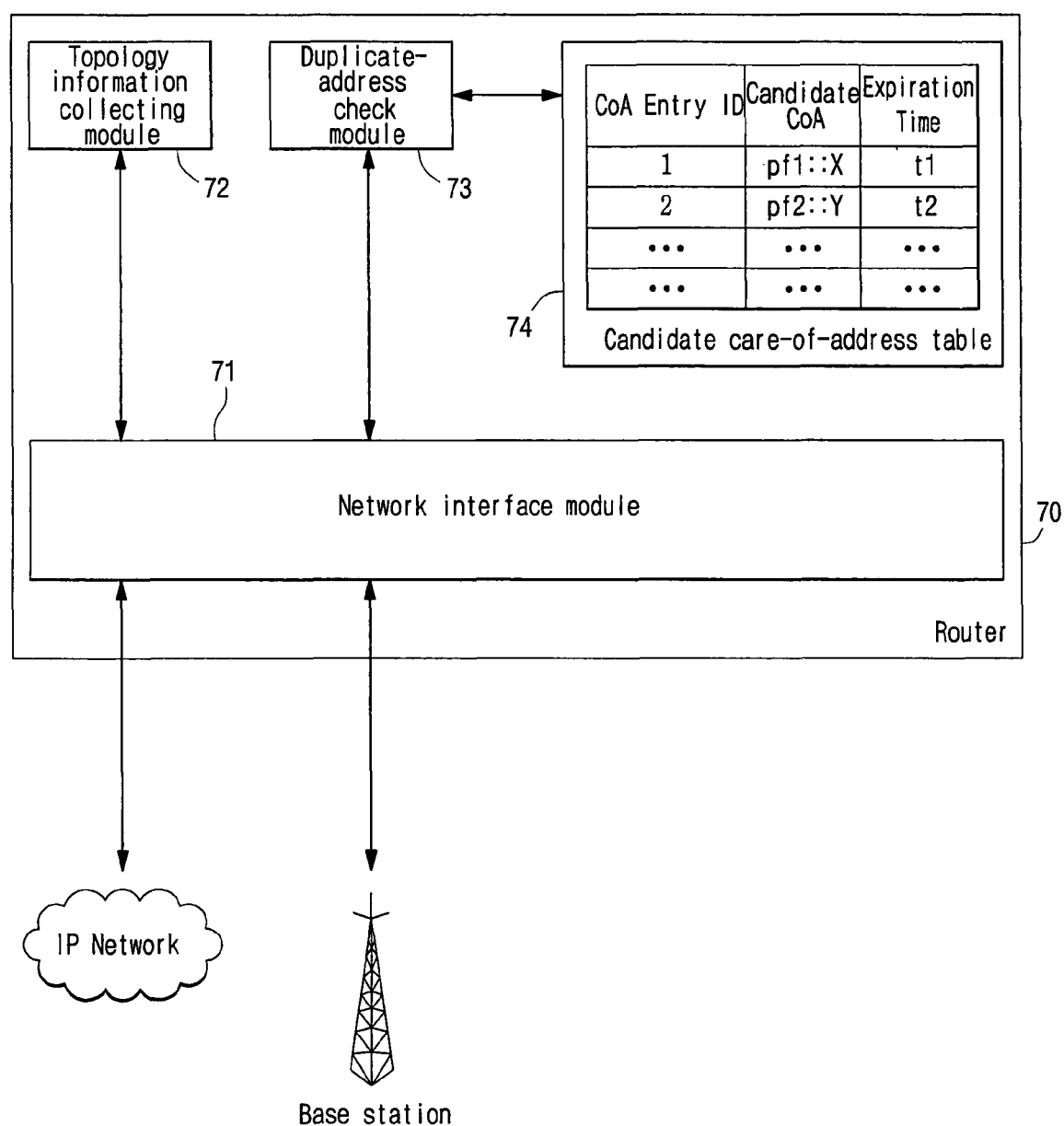
FIG. 11 is a block diagram illustrating a structure of a router according to still another exemplary embodiment of the present invention.

FIG. 11 is a block diagram illustrating a structure of a router according to still another exemplary embodiment of the present invention. Referring to FIG. 11, a router 70 can include a network interface module 71, a topology information collecting module 72, a duplicate-address check module 73, and a candidate care-of-address table 74.

The network interface module 71 is for connection with network equipment. The network interface module 71 can issue a control command to the network equipment and transmit and receive data through protocols, such as SNMP, CLI, TCP/IP and the like. The router 70 transmits and receives data to and from the base station or the handover control system 50 via the network interface module 71.

The topology information collecting module 72 collects topology information of base stations belonging to the router. Upon receipt of a topology information request from the handover control system 50, the topology information collecting module 72 controls the network interface module 71 to communicate with the base stations and obtain the information.

According to process S806, the duplicate-address check module 73 controls a duplicate-address check process using information included in a DAD request message received from the handover control system 50. After the duplicate-address check process is completed, the duplicate-address check module 73 updates the candidate care-of-address table 74 and simultaneously returns a DAD response message to the handover control system 50. Of course, when the DAD request message is not received for a predetermined period of time, which is measured by a timer (not shown), the duplicate-address check module 73 deletes the entry corresponding to the candidate care-of-address.

Figure 12:
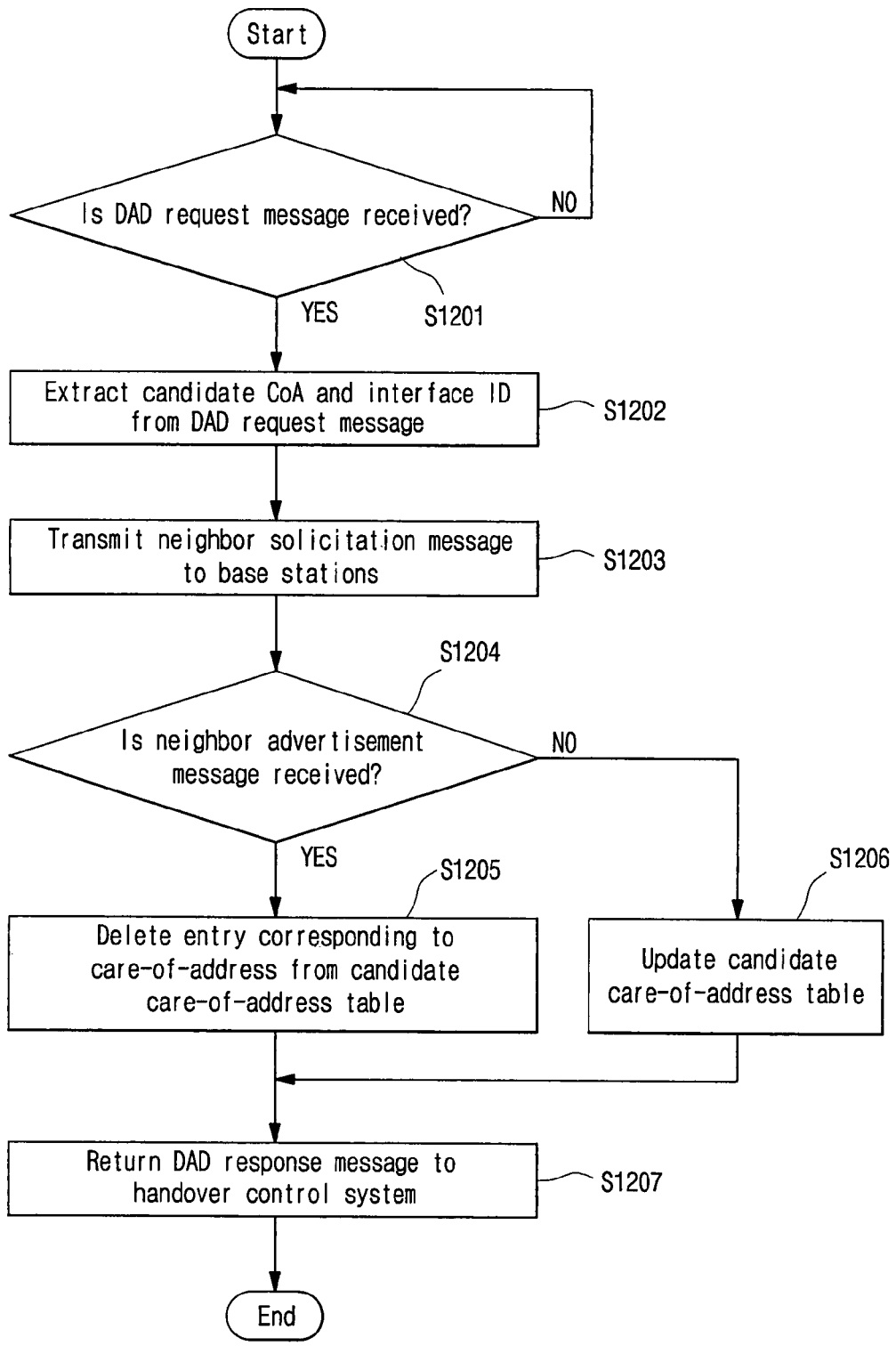
FIG. 12 is a flowchart illustrating a process of checking for a duplicate address in the router shown in FIG. 11.

FIG. 12 is a flowchart illustrating a process of checking for a duplicate address in the router shown in FIG. 11. First, the router determines whether the DAD request message is received from the handover control system 50 (S1201). The duplicate-address check module 73 of the router extracts a candidate care-of-address (CoA) and an interface ID (I/F ID) from the DAD request message and sends them to the network interface module 71 (S1202).

The network interface module 71 transmits a neighbor solicitation message for the received candidate care-of-address to a number of base stations connected to the interface (S1203). The duplicate-address check module 73 checks whether the neighbor advertisement message is received as a response to the neighbor solicitation message (S1204).

If the neighbor advertisement message is received, the duplicate-address check module 73 checks whether the care-of-address is pre-stored in the candidate care-of-address table 74, and deletes the corresponding entry (S1205). Meanwhile, if the neighbor advertisement message is not received for a predetermined period of time, the duplicate-address check module 73 updates the candidate care-of-address table 74 (S1206). Specifically, the duplicate-address check module 73 updates the expiration time when there is an entry of the care-of-address and registers a new entry when there is no entry of the care-of-address. The duplicate-address check module 73 then returns the DAD response message including information that indicates whether the candidate care-of-address is a duplicate, to the handover control system 50, terminating the duplicate-address check process (S1207).

Figure 13:
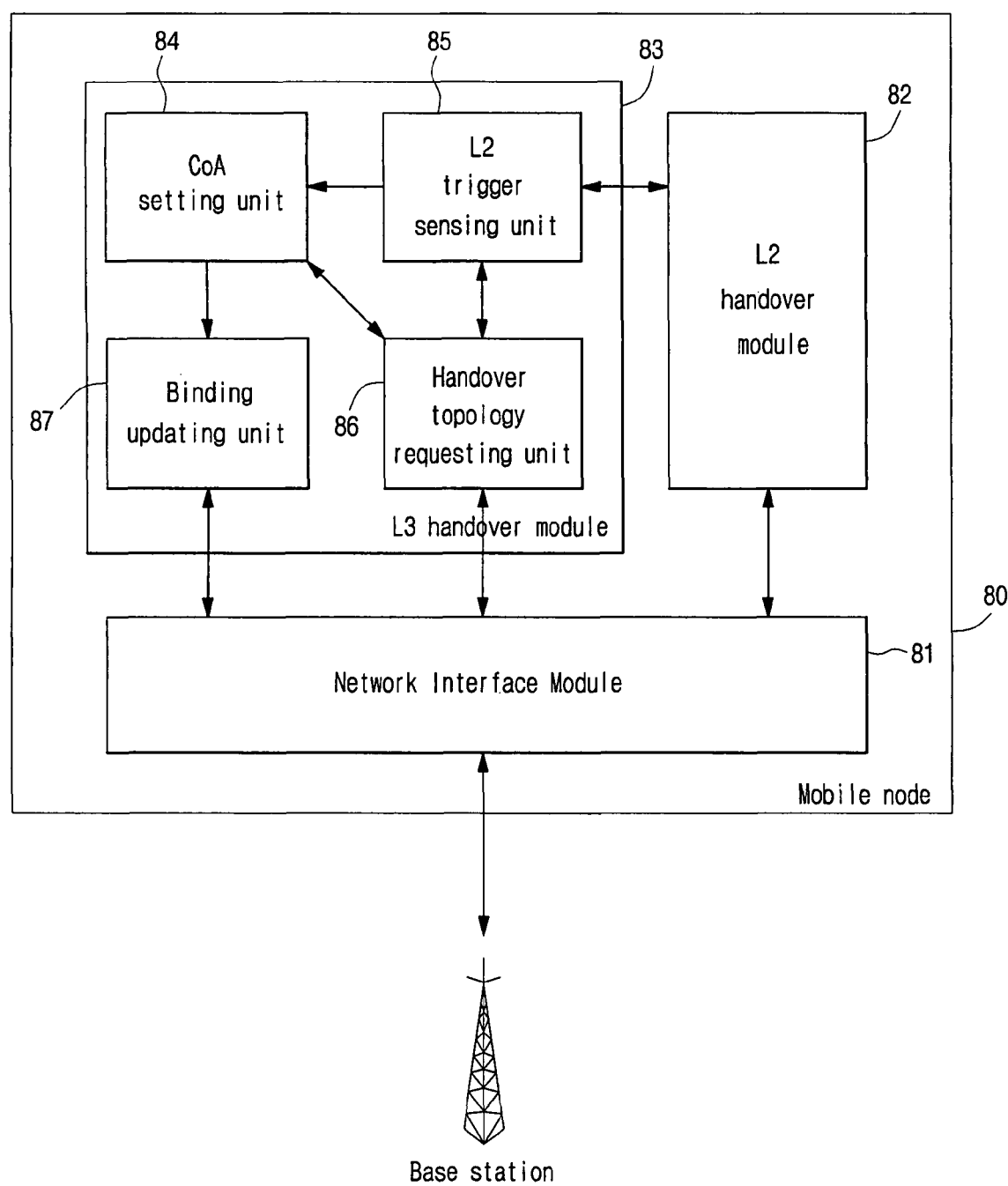
FIG. 13 is a block diagram illustrating a structure of a mobile node according to still another exemplary embodiment of the present invention.

FIG. 13 is a block diagram illustrating a structure of a mobile node 80 according to still another exemplary embodiment of the present invention. As shown in FIG. 13, a mobile node 80 can include L2 and L3 handover modules 82 and 83, and a network interface module 81. Of course, the mobile node 80 can include a user interface, application programs, and the like to provide wireless service to a user. However, only handover-related components of the mobile node 80 are shown in FIG. 13.

The network interface module 81 is for communication with the base station. The L2 and L3 handover modules 82 and 83 perform L2 handover and L3 handover, respectively. In particular, the L3 handover module 83 can include a CoA setting unit 84, an L2 trigger sensing unit 85, a handover topology requesting unit 86, and a binding updating unit 87.

The L2 trigger sensing unit 85 senses a termination time of the L2 handover. When a L2 handover finish trigger is sensed from the L2 handover module 82, the L3 handover is initiated.

The handover topology requesting unit 86 sends a handover topology request message to the handover control system 50 in order to perform the L3 handover and receives a response thereto. The response includes a candidate care-of-address. The CoA setting unit 84 rapidly performs the L3 handover using the candidate care-of-address. When the CoA setting unit 84 changes the L3 address of the mobile node 80, the binding updating unit 87 performs a binding update procedure with the base station and the correspondent node.

Figure 14:
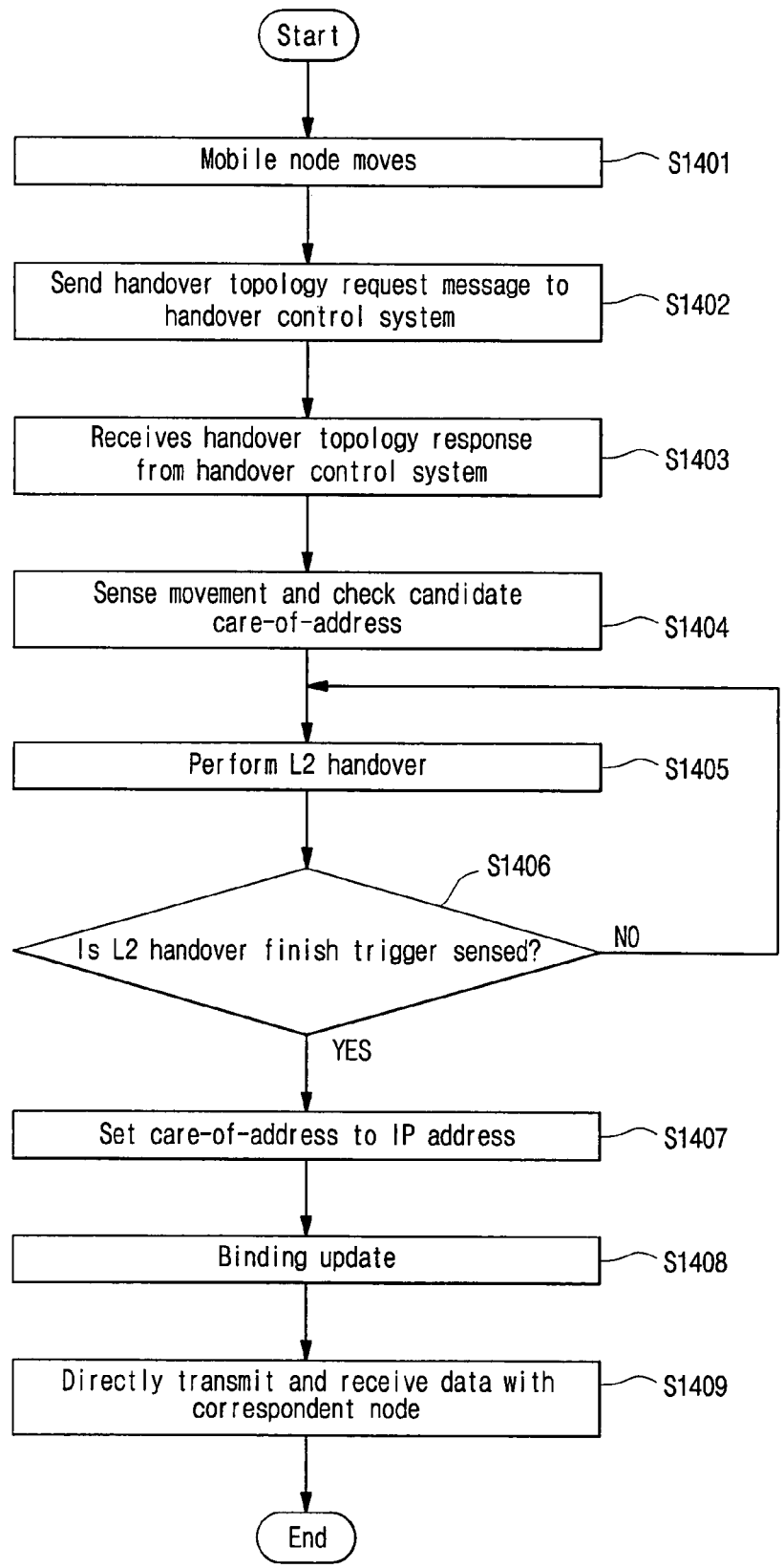
FIG. 14 is a flowchart illustrating L3 handover of the mobile node shown in FIG. 13.

FIG. 14 is a flowchart illustrating L3 handover of the mobile node shown in FIG. 13. The mobile node 80 can provide service to a user and move (S1401). The handover topology requesting unit 86 sends the handover topology request message to the handover control system 50 (S1402), and receives a response including the candidate care-of-address (S1403). This allows the mobile node 80 to sense its own movement and confirm the care-of-address to be used, in advance (S1404).

Now, the mobile node 80 moves to a coverage area of a new router to perform the L2 handover (S1405). The L2 trigger sensing unit 85 senses a trigger indicating the termination of the L2 handover (S1406). When the L2 handover finish trigger is sensed, the CoA setting unit 84 converts the address of the mobile node 80 into the care-of-address confirmed in step S1407.

The binding updating unit 87 of the mobile node then performs a binding update procedure with the correspondent node (S1408). After performing the binding update procedure with the correspondent node, the mobile node directly transmits and receives data with the correspondent node (S1409).

Figure 15:
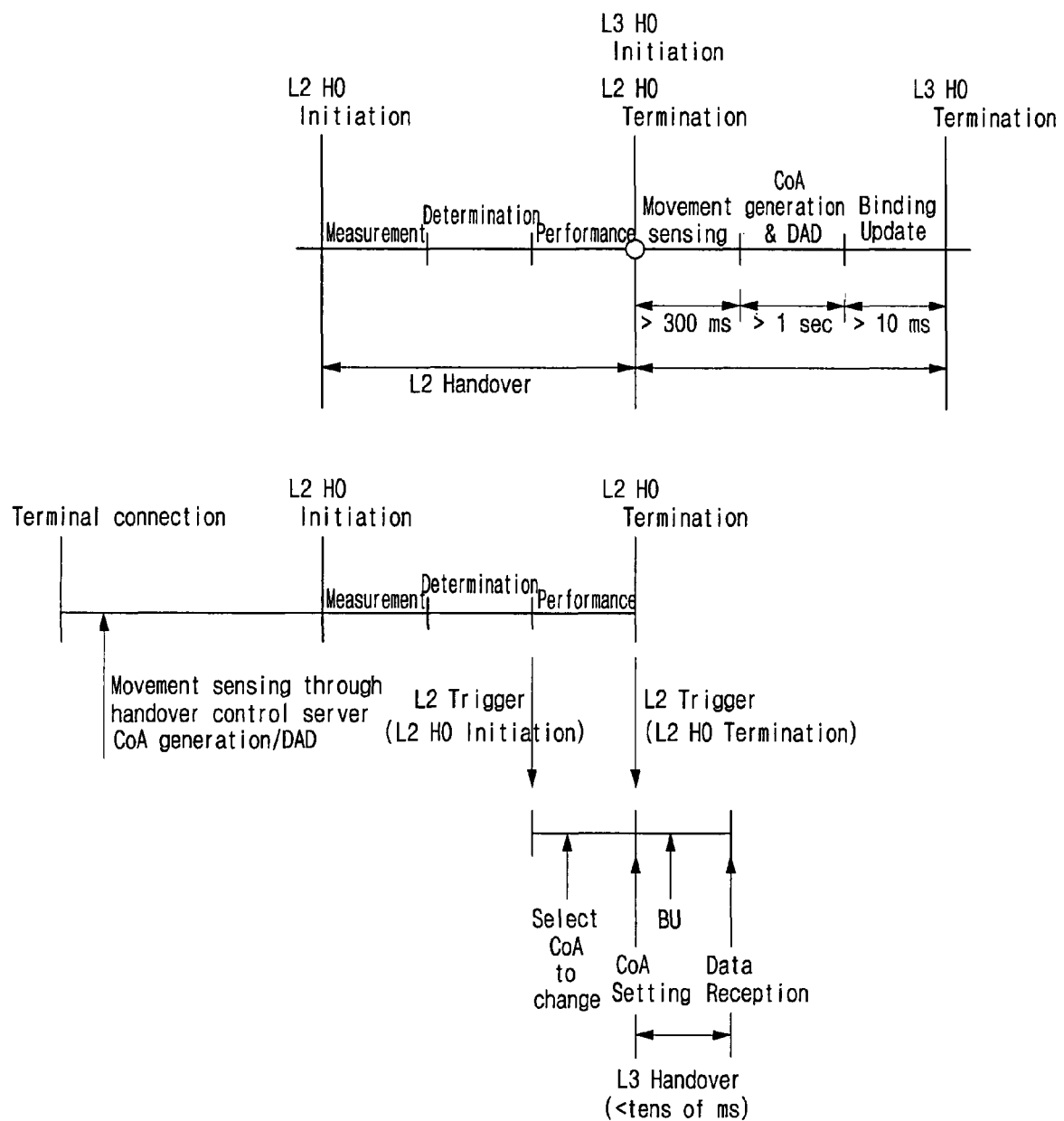
FIG. 15 illustrates a handover time in the handover control system according to the present invention.

FIG. 15 illustrates a handover time in the handover control system according to the present invention. With the handover control system described above, the mobile node performs movement sensing, care-of-address generation, and duplicate address check procedures in advance. Performing the L2 handover, the mobile node prepares the L3 handover in advance, sets the IP address of the mobile node to the pre-generated care-of-address, and transmits the binding update message to the home agent and the correspondent node. As shown in FIG. 15, the experimental results showed that the L3 handover time, which was over 1.3 seconds in the MIPv6 of FIG. 1, was shortened to tens of ms or less.

Figure 16:
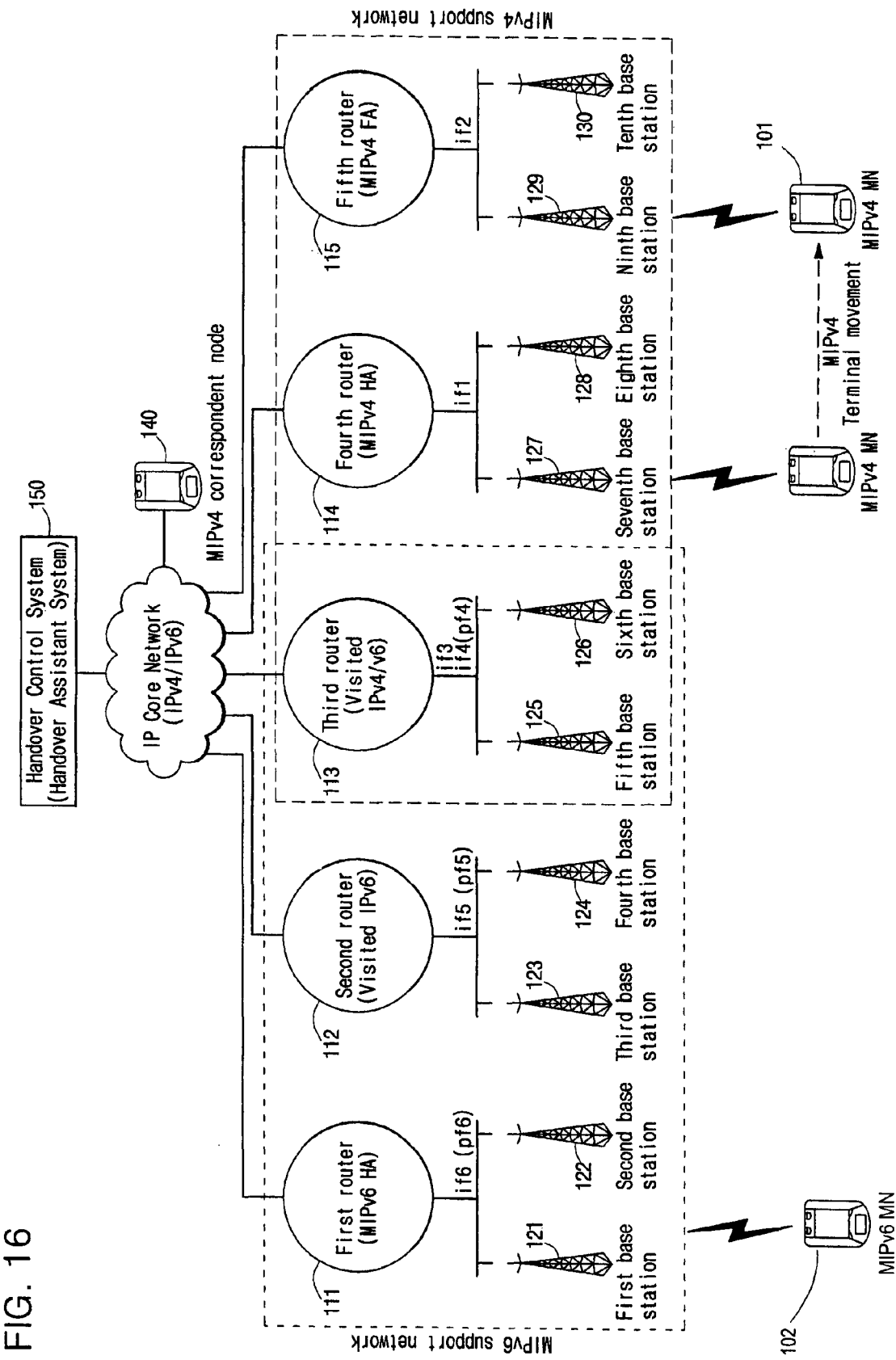
FIG. 16 is a block diagram illustrating an MIPv4 and MIPv6 combination network according to still another exemplary embodiment of the present invention.

FIG. 16 is a block diagram illustrating an MIPv4 and MIPv6 combination network according to still another exemplary embodiment of the present invention. Referring to FIG. 16, the combination network can include an IPv4/IPv6 core network, a number of IPv4 routers 114 and 115, a number of IPv6 routers 111 and 112, an IPv4/IPv6 router 113, a number of wireless base stations 121 to 130, an MIPv4 mobile node 101, an MIPv4 correspondent node 140, and a handover control system 150. It is to be understood that the topology of any components shown except the handover control system 150 can be modified. For example, the MIPv4 home agent and the MIPv6 home agent can be disposed at a different position than shown in FIG. 16. The IPv6 routers 111 and 112 can support an MIPv6 function, and the IPv4 routers 114 and 115 can serve as an MIPv4 home agent or an MIPv4 foreign agent. The IPv4/IPv6 router 113 supports an MIPv4 and MIPv6 function.

Figure 17:
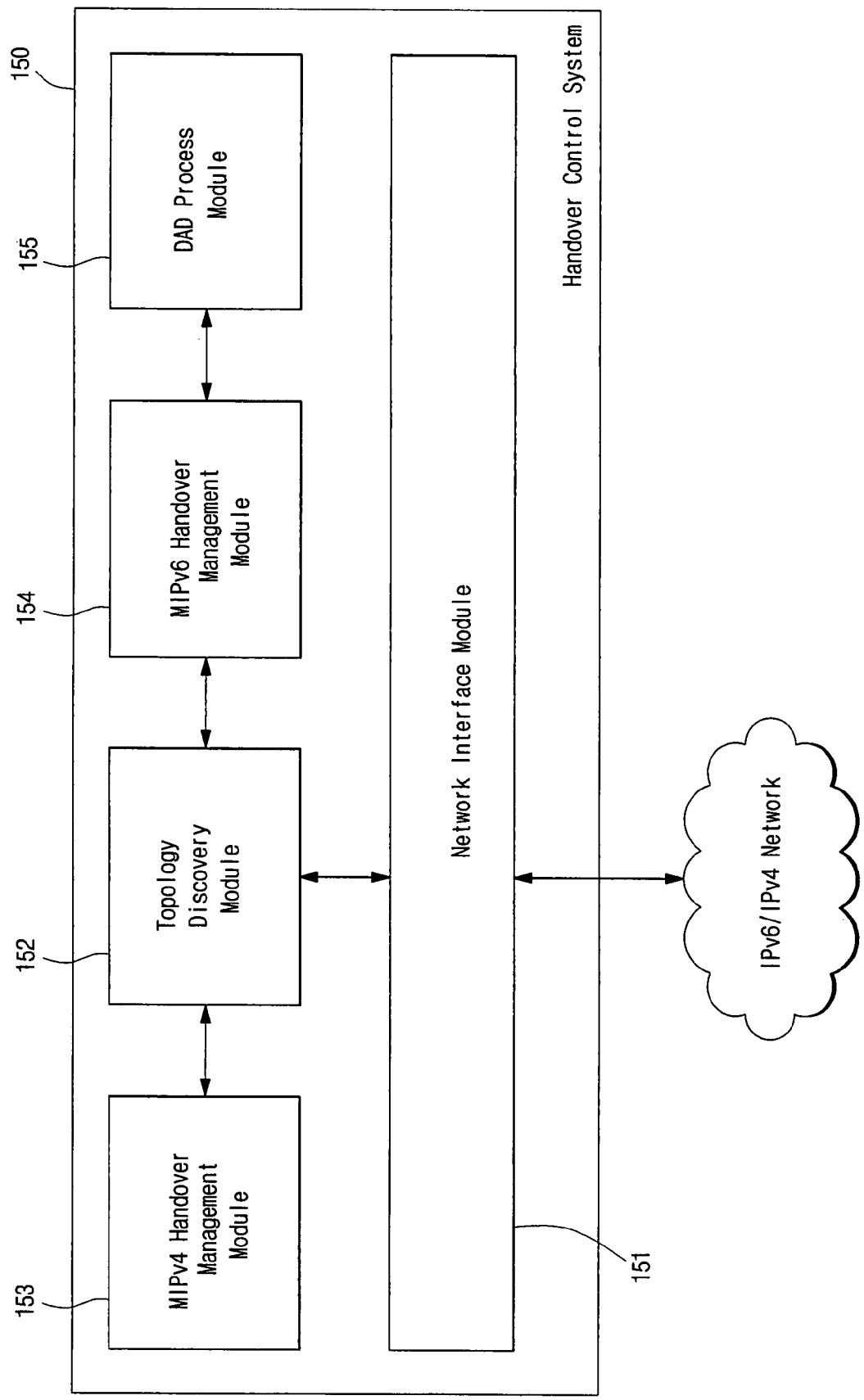
FIG. 17 is a block diagram illustrating a handover control system according to still another exemplary embodiment of the present invention.

FIG. 17 is a block diagram illustrating a handover control system 150 of FIG. 16 according to the present invention. The handover control system 150 can include a network interface module 151, a topology discovery module 152, an MIPv4 handover management module 153, an MIPv6 handover management module 154, and a DAD process module 155. The handover control system 150 shown in FIG. 17 is the same as the handover control system 50 of FIG. 5 except that the former includes the handover management modules 153 and 154 corresponding to the respective IP versions.

A topology request message is transmitted from the mobile nodes 101 and 102 to the topology discovery module 152 via the network interface module 151. In this case, the mobile nodes 101 and 102 transmit the topology request message including desired MIP version information. For example, the MIPv4 terminal 101 transmits a topology request message including MIPv4 version information and the MIPv6 terminal 102 transmits a topology request message including MIPv6 version information.

The topology discovery module 152 checks the MIP version information of the mobile nodes 101 and 102, which is included in the topology request message, and selectively requests the MIPv6 handover management module 154 or the MIPv4 handover management module 153 to search for target routers according to the MIP version information. If the mobile node 101 supports MIPv4, the topology discovery module 152 requests the MIPv4 handover management module 153 to search for the target routers.

Meanwhile, the MIPv4 handover management module 153 and the MIPv6 handover management module 154 produce a handover topology table and map for each version. The handover topology table and map will be described in detail through Table 4 and Table 5. The MIPv4 handover management module 153 and the MIPv6 handover management module 154 search for the target routers for each mobile node version in response to the request from the topology discovery module 152.

The MIPv4 handover management module 153 or the MIPv6 handover management module 154 transmits topology information of the searched target routers to the mobile nodes 101 and 102. The topology information can be included in a topology response message and transmitted to the mobile node via the network interface module 151.

Figure 18:
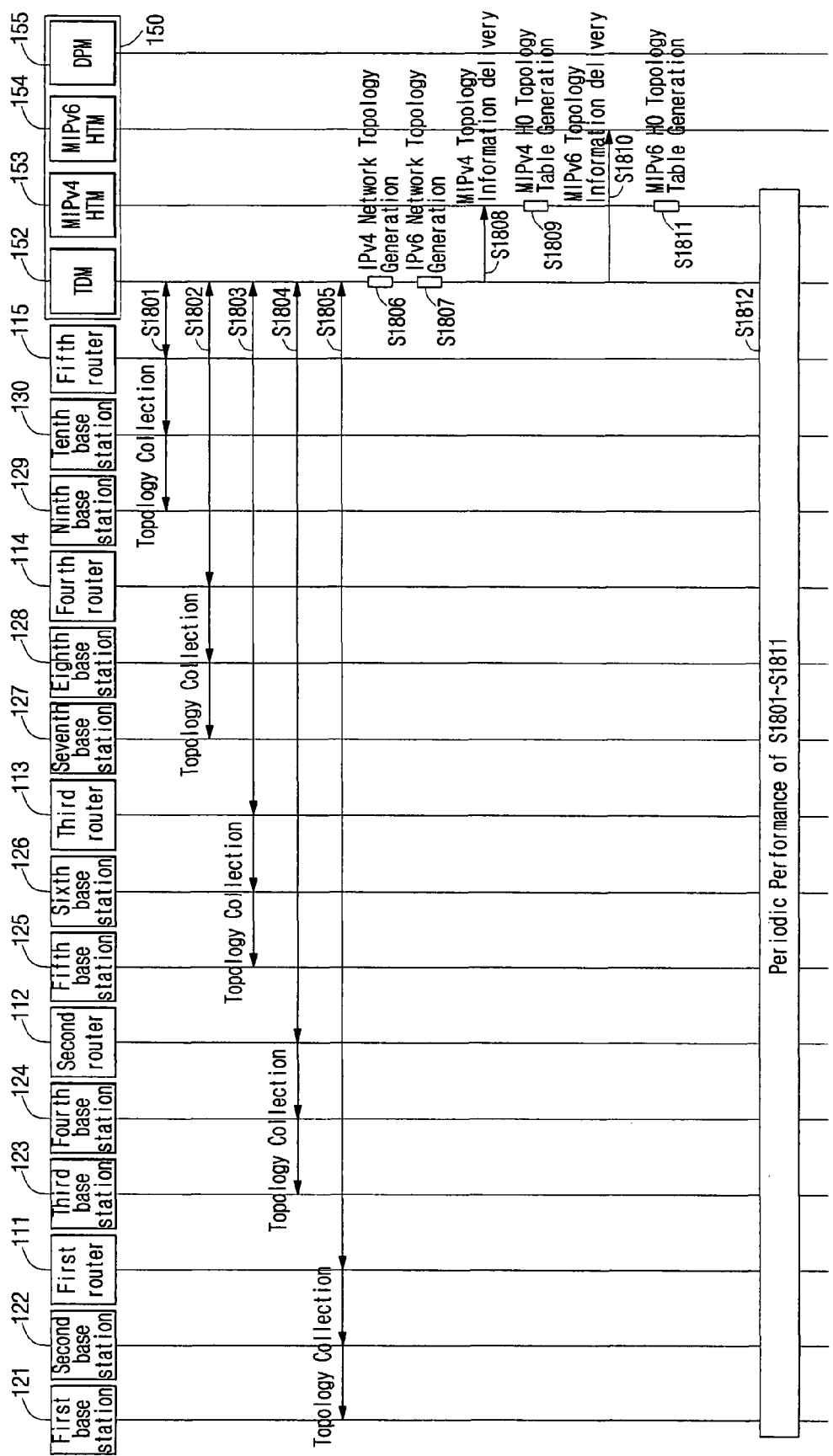
FIG. 18 is a flowchart illustrating a process of collecting handover topology information in the handover control system according to still another exemplary embodiment of the present invention.

FIG. 18 is a flowchart illustrating a process of collecting handover topology information in the handover control system according to the present invention. The topology discovery module 152 of the handover control system 150 periodically collects information on the IPv6 routers, the IPv4 routers, the IPv4/IPv6 router, and wireless base stations managed by the respective routers using functions, such as SNMP, of the network interface module 151 (S1801 to S1805). A process of collecting the topology information from five routers 111 to 115 and ten base stations 121 to 130 belonging to the routers is shown in FIG. 18.

The handover control system 150 separately produces an IPv4 network topology table and an IPv6 network topology table using the collected information on the routers 111 through 115 and the wireless base stations 121 through 130 (S1806, S1807). The handover control system 150 sends the information on the routers 113 through 115 and the wireless base stations 125 through 130 associated with the MIPv4 handover to the MIPv4 handover management module 153 (S1808), and sends the information on the routers 111 through 113 and the wireless base stations 121 through 126 associated with the MIPv6 handover to the MIPv6 handover management module 154 (S1810). Using the received information on the routers and the wireless base stations, the MIPv4 handover management module 153 and the MIPv6 handover management module 154 produce the following handover topology tables, respectively (S1809, S1811).

TABLE 4

| Router ID | Router Capability | Function | I/F ID | CoA Flag | CoA | Base Station ID | Coordinate | Coverage | Others |
|---|---|---|---|---|---|---|---|---|---|
| Router 3 | IPv4/IPv6Dual Stack | FA | if3 | C-CoA | CoA 1 | BS5 | (x5, y5) | K5 | — |
|  |  |  |  |  |  | BS6 | (x6, y6) | K6 | — |
| Router 4 | IPv4 Only | HA | if1 | FA-CoA | CoA 2 | BS7 | (x7, y7) | K7 | — |
|  |  |  |  |  |  | BS8 | (x8, y8) | K8 | — |
| Router 5 | IPv4 Only | FA | if2 | FA-CoA | CoA 3 | BS9 | (x9, y9) | K9 | — |
|  |  |  |  |  |  | BS10 | (x10, y10) | K10 | — |

TABLE 5

| Router ID | Router Capability | Function | I/F ID | Prefix | Base Station ID | Coordinate | Coverage | Others |
|---|---|---|---|---|---|---|---|---|
| Router 1 | IPv6 Only | HA | if3 | pf1 | BS1 | (x1, y1) | K1 | — |
|  |  |  |  |  | BS2 | (x2, y2) | K2 | — |
| Router 2 | IPv6 Only | Visited | if2 | pf2 | BS3 | (x3, y3) | K3 | — |
|  |  |  |  |  | BS4 | (x4, y4) | K4 | — |
| Router 3 | IPv4/IPv6 DualStack | Visited | if2 | pf2 | BS5 | (x5, y5) | K5 | — |
|  |  |  |  |  | BS6 | (x6, y6) | K6 | — |

As shown in Table 4, the MIPv4 handover topology table can include router IDs, router IPv4/IPv6 support information, HA/FA function support information, base station interfaces, FA-CoA/C-CoA support information, CoA values, IDs of base stations connected to routers, base station locations, base station coverage, etc. After producing the handover topology table, the MIPv4 handover management module 153 produces the MIPv4 handover topology map using the table. The MIPv4 handover topology map includes location and coverage information of the base stations 125 through 130 connected to the routers 113 through 115 supporting the MIPv4.

Using the handover topology map, the handover control system 150 can search for adjacent base stations to which the mobile nodes 101 and 102 are likely to move by mapping the location of the base station where the mobile nodes 101 and 102 are located, to the topology map when receiving the handover topology information request from the mobile nodes 101 and 102. Specifically, the handover control system 150 can determine that the mobile nodes are likely to move to adjacent base stations having overlapping coverage with the base station where the mobile nodes 101 and 102 are located, and can provide the information on the respective base stations to the mobile nodes 101 and 102 in advance. The handover control system 150 can periodically perform the network topology collecting procedure to update the network topology which changes (S1812).

Figure 19A:
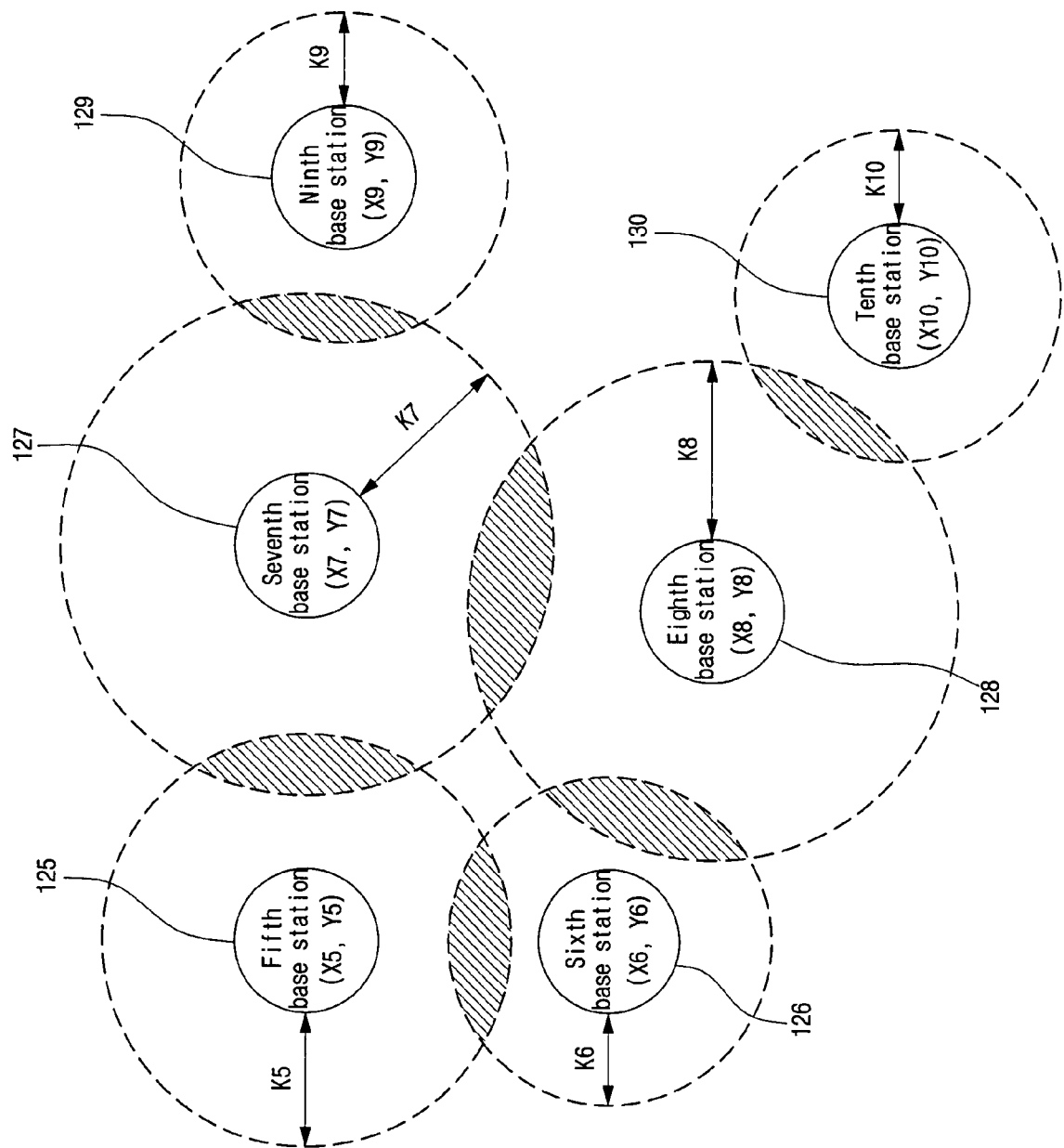
FIG. 19A illustrates an MIPv4 handover topology map according to still another exemplary embodiment of the present invention.
Figure 19B:
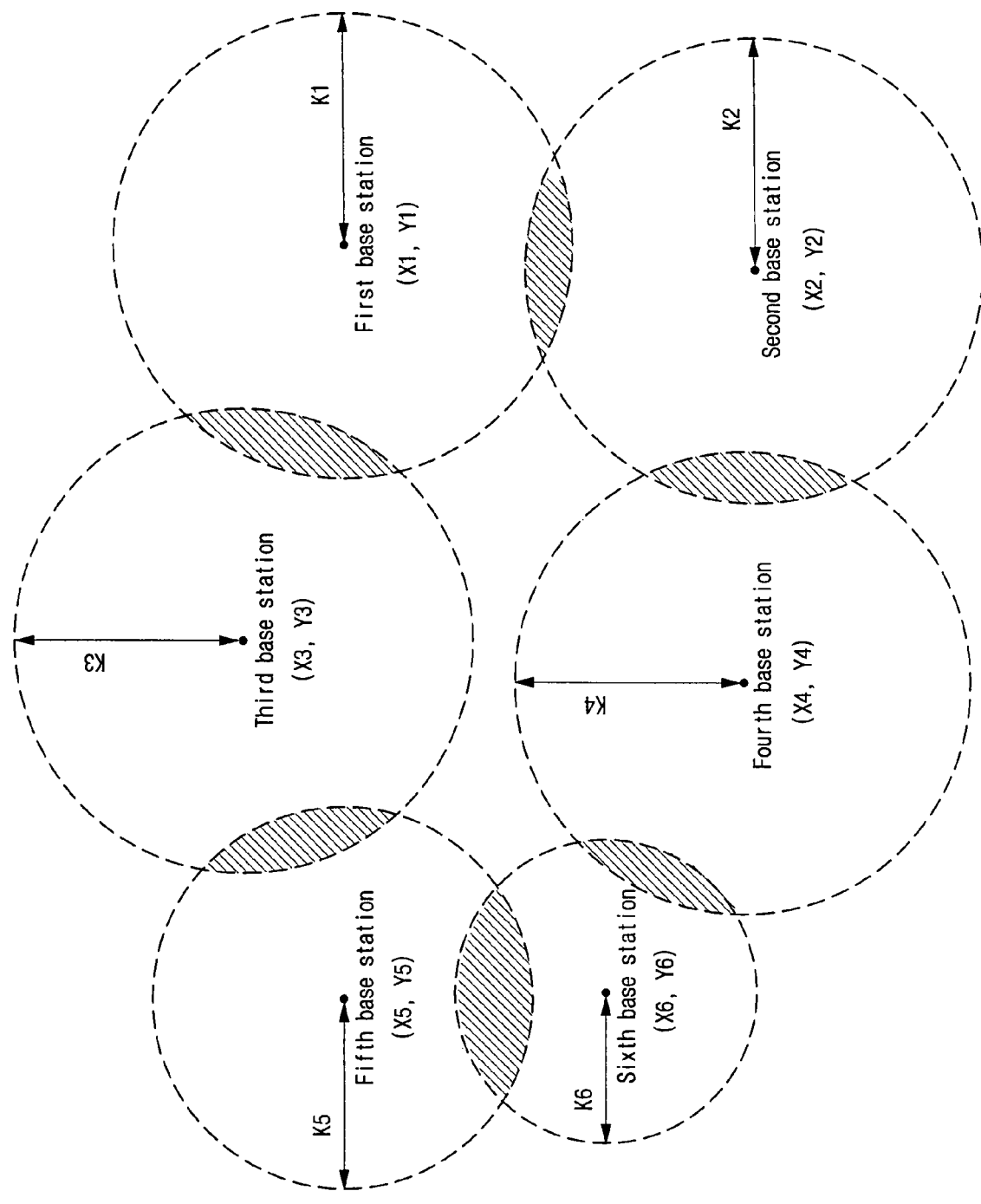
FIG. 19B illustrates an MIPv6 handover topology map according to still another exemplary embodiment of the present invention.

FIG. 19A illustrates an MIPv4 handover topology map according to still another exemplary embodiment of the present invention, and FIG. 19B illustrates an MIPv6 handover topology map according to still another exemplary embodiment of the present invention. The MIPv4 handover management module 153 of FIG. 17 checks the base station IDs, the location coordinates corresponding to the base station IDs, and the coverage stored in the table of Table 4 to draw coverage areas of the respective base stations 125 to 130 supporting the MIPv4.

For example, in order to plot a map for the fifth base station 125, the MIPv4 handover management module 153 recognizes the coordinate of the fifth base station 125 as (x5, y5). The handover management module 153 marks a point at the coordinate (x5, y5), and indicates that the point denotes the fifth base station 125. The MIPv4 handover management module 153 also checks that the coverage of the fifth base station 125 is K5. The handover management module 153 draws a circle with a radius of K5 around the coordinate (x5, y5) of the fifth base station 125 as its center. The MIPv4 handover management module 153 repeatedly performs the same task on the sixth through tenth base stations 125 through 130, resulting in a handover topology map of the MIPv4 base station shown in FIG. 19A.

Meanwhile, the MIPv6 handover management module 154 produces handover topology maps of the base stations 121 through 125 supporting the MIPv6 by using Table 5. Since the process of producing the handover topology maps of the MIPv6 base stations 121 through 125 is substantially the same as in the MIPv4, a detailed description thereof will be omitted.

FIG. 20 is a flowchart illustrating a MIPv4 handover process using a handover control system according to still another exemplary embodiment of the present invention. The mobile node 101 supporting the MIPv4 performs an initial connection procedure with the seventh base station 127 (S2001). When the connection is made, the mobile node 101 starts to transmit and receive data to and from the MIPv4 correspondent node 140 (S2002).

The mobile node 101 transmits a handover (HO) topology request message to the handover control system 150 in order to obtain information on ambient base stations to which the mobile node 101 is likely to move, candidate care-of-address information, and the like (S2003). The handover topology request message includes mobile IP version of the mobile node, the IP address of mobile node, the MAC address of the mobile node, the ID of the base station to which the mobile node is currently connected, etc.

Upon receipt of the handover topology request message, the topology discovery module 152 of the handover control system 150 first checks the mobile IP version of the mobile node 101 (S2004). If the mobile IP version is MIPv4, the topology discovery module 152 sends the information on the mobile node 101 to the MIPv4 handover management module 153 (S2005).

The MIPv4 handover management module 153 searches for the seventh base station 127 to which the mobile node 101 is connected, on the handover topology map of FIG. 19A, and discovers base stations having an overlapping coverage with the seventh base station 127 (S2006). In FIG. 19A, it can be seen that the base stations having an overlapping coverage with the seventh base station 127 are the fifth, eighth, and ninth base stations 125, 128 and 129.

Then, the MIPv4 handover management module 153 extracts the information on the searched base stations from the handover topology table, and transmits a handover topology response message including the topology information of the base stations to the mobile node 101 (S2007). The base station information included in the handover topology response message includes MIP version, IDs of base stations to which the mobile node 101 is likely to move, candidate care-of-address flags of the base stations, candidate care-of-address values, etc. In the present embodiment, since the searched base stations are the fifth, eighth, and ninth base stations 125, 128 and 129, the handover topology response message includes (MIPv4, BS5, C-CoA, CoA1), (MIPv4, BS8, FA-CoA, CoA2), and (MIPv4, BS9, FA-CoA, CoA3) information.

From the handover topology response message, the mobile node 101 can recognize that the base stations to which the mobile node 101 is likely to move are the fifth, eighth, and ninth base stations, available candidate care-of-addresses are CoA1, CoA2, and CoA3, and the candidate care-of-addresses are respectively of C-CoA, FA-CoA, and FA-CoA types.

The mobile node 101 compares a subnet of the network to which the mobile node 101 is currently connected, with the candidate care-of-address to recognize the necessity of IP subnet change (S2008). If each IP subnet is to be changed, the mobile node 101 can generate a candidate care-of-address to use, in advance (S2009). In the example of the present invention, the mobile node 101 is connected to the seventh base station 127, and the seventh base station 127 is connected to the same IP subnet as the eighth base station 128. Accordingly, when the mobile node 101 moves to the fifth and ninth base stations 125 and 129, an MIPv4 procedures are required due to the IP subnet change, and when the mobile node 101 moves to the eighth base station 128, only an L2 handover procedure is required. By transmitting the handover topology request message to the handover control system 150 in a predetermined period T1 (S2010), the mobile node 101 repeatedly performs the processes S2004 to S2009 (S2011).

Now, when the mobile node 101 moves from the coverage area of the seventh base station 127 to the coverage area of the ninth base station 129, the mobile node 101 first generates an L2 HO initiation trigger signal indicating that the L2 handover is initiated (S2012). In this case, the mobile node 101 can recognize its movement to the ninth base station 129 and be ready to set pre-generated FA-CoA=CoA3.

The mobile node 101 performs the L2 handover from the seventh base station 127 to the ninth base station 129 (S2013). The mobile node 101 then moves from the area of the seventh base station 127 to the area of the ninth base station 129 (S2014). After completing the L2 handover, the L2 layer of the mobile node 101 sends an L2 HO finish trigger signal to the L3 or higher layer (S2015).

The mobile node 101 sets anew CoA to CoA3 (S2016) and transmits a registration request message to the fifth router 115, which is a FA (S2017). Upon receipt of the registration request message, the fifth router 115 updates a visitor list (S2018) and sends an RRQ to the fourth router 114, which is an HA (S2019). When receiving the RRQ, the fourth router 114 returns an RRP to the fifth router 115 (S2020) and also sends the RRP to the mobile node 101, completing the MIPv4 registration process (S2021).

Now, traffic from the correspondent node 140 is transmitted to the fourth router 114, which is a home agent (S2022). In the example of the present invention, since the ninth base station 120 uses a FA-CoA care-of-address, a tunnel is established from the fourth router 114, which is a home agent, to the fifth router 115, which is a foreign agent, so that the data from the correspondent node 140 is transferred (S2023). When the data from the correspondent node 140 is received through the tunnel, the fourth router 114 removes the established tunnel and sends the data to the mobile node 101 (S2024). Data from the mobile node 101 can be sent to the correspondent node 140 directly or through a reverse tunnel according to the capability of the mobile node 101 and the function of the foreign agent (S2025).

The handover process in the mobile node 101 supporting the MIPv4 has been described in FIG. 20. Since a handover process in the mobile node 102 supporting the MIPv6 is substantially the same as in FIG. 8, a description thereof will be omitted.

FIG. 21 illustrates a handover time in the handover control system according to the present invention. When the handover control system 150 is used as described above, the mobile nodes 101 and 102 perform a movement sensing and care-of-address generating procedure in advance. Thereafter, the mobile nodes 101 and 102 perform L2 handover, set IP addresses of the mobile nodes 101 and 102 to the pre-generated care-of-address, and perform registration procedure.

As shown in FIG. 21, a time taken in the L3 handover process in MIPv4 of FIG. 1 includes a movement sensing and care-of-address generating time of about 1.5 sec and a binding update time of 50 ms. However, in the present invention, since the movement sensing and care-of-address generation process is performed in advance, only the registration procedure is performed in the L3 handover process. Accordingly, the L3 handover time can be shortened to tens of ms or less.

As described above, with the system and method for controlling the L3 handover of the mobile node according to the present invention, routers to which the mobile node is likely to move are searched for in advance, the care-of-address (CoA) is generated through combination of the address of the router with the address of the mobile node, and it is checked in advance whether the generated care-of-address is a duplicate. Thus, L3 handover time can be shortened to tens of ms or less and seamless real-time multimedia services such as VoIP, IP-TV, VoD and the like can be provided to subscribers even though the terminals move.

While the present invention has been described with reference to exemplary embodiments thereof, it will be understood by those skilled in the art that various changes in form and detail can be made therein without departing from the scope of the present invention as defined by the following claims.

What is claimed is:

1. A handover control system, comprising:
   a topology discovery module to collect topology information of a plurality of routers and a plurality of base stations;
   a handover management module to generate a handover topology map using the topology information of the plurality of base stations and the plurality of routers, to map current locations of a plurality of mobile nodes to the handover topology map, to search for a plurality of target routers having a highest probability of handover for at least one of the plurality of mobile nodes, to transmit state information of the searched plurality of target routers to the at least one of the plurality of mobile nodes, and to generate a candidate care-of-address; and a duplicate-address detection (DAD) process module to request at least one of the plurality of target routers to determine whether the candidate care-of-address is a duplicate.

2. The system of claim 1, further comprising a handover topology table comprising at least one element selected from a group consisting of identities (IDs) of the plurality of routers, interface information of the plurality of routers, prefix of the plurality of routers, IDs of the plurality of base stations associated with the plurality of routers, location information of the plurality of base stations, and coverage information of the plurality of base stations.

3. The system of claim 1, further comprising a care-of-address table comprising at least one element selected from a group consisting of Media Access Control (MAC) Addresses of the plurality of mobile nodes, IDs of the plurality of base stations having a highest probability of handover for the at least one of the plurality of mobile nodes, candidate care-of-addresses, collided care-of-addresses, and entry expiration times, and wherein the handover management module requests the DAD process module to determine if the candidate care-of-address is a duplicate and the DAD process module transmits a DAD request message to the plurality of base stations and the plurality of routers.

4. The system of claim 1, wherein the handover management module is further configured to transmit a plurality of topology response messages to the at least one of the plurality of mobile nodes in response to topology request messages to request information on the plurality of target routers and the plurality of base stations having a highest probability of handover for the at least one of the plurality of mobile nodes, the plurality of topology response messages comprising IDs of the plurality of target routers, candidate care-of-addresses, and candidate care-of-address duplicate information.

5. The system of claim 4, the DAD process module deletes the candidate care-of-address from the candidate care-of-address table in response to not receiving the DAD request message for the care-of-address within an entry expiration time period.

6. The system of claim 1, wherein the system is configured to generate a handover topology map for each mobile Internet protocol (MIP) version supported by the plurality of base stations.

7. The system of claim 6, wherein the handover management module is further configured to check the MIP version supported by the at least one of the plurality of mobile nodes, and to map a current location of the at least one of the plurality of mobile nodes to the handover topology map corresponding to the MIP version supported by the at least one of the plurality of mobile nodes to search for the plurality of target routers.

8. A router, comprising:
a network interface module to communicate with a plurality of network elements over an IP network and to receive a duplicate-address detection (DAD) request message;
a topology information collecting module to collect topology information of a plurality of base stations managed by the router;
a duplicate-address check module to transmit, via the network interface module, a neighbor solicitation message comprising candidate care-of-address information to the plurality of base stations managed by the router and a plurality of mobile nodes, and to determine whether the candidate care-of-address information is a duplicate based on whether a neighbor advertisement message is received as a response to the neighbor solicitation message; and
a candidate care-of-address table to store at least one element selected from a group consisting of care-of-address entry IDs, candidate care-of-addresses, and expiration times,
wherein the duplicate-address check module is further configured to determine that the candidate care-of-address information is a duplicate upon the neighbor advertisement message being received, and
wherein if the candidate care-of information of one of the plurality of mobile nodes to be newly connected is the same as a candidate care-of-address in a candidate care-of-address table, the router deletes the candidate care-of-address in the care-of-address table.

9. A method, comprising:
producing, by a handover control system, a handover topology map based on state information of a plurality of routers and a plurality of base stations associated with the plurality of routers;
receiving, by the handover control system, a request to provide information on a plurality of target routers having a highest probability of handover for at least one of the plurality of mobile nodes;
mapping, by the handover control system, a current location of the at least one of the plurality of mobile nodes to the handover topology map to search for the plurality of target routers having a highest probability of handover for the at least one of the plurality of mobile nodes; and
transmitting state information of the searched target routers to the at least one of the plurality of mobile nodes.

10. The method of claim 9, wherein the state information of the plurality of routers comprises at least one element selected from a group consisting of identities (IDs) of the plurality of routers, interface information of the plurality of routers, prefix of the plurality of routers, IDs of the plurality of base stations associated with the plurality of routers, location information of the plurality of base stations, and coverage information of the plurality of base stations.

11. The method of claim 9, wherein the mapping and the transmitting comprise:
combining prefix information of the plurality of target routers with Media Access Control (MAC) addresses of the plurality of mobile nodes to generate candidate care-of-addresses; and
transmitting the generated candidate care-of-addresses to the plurality of mobile nodes.

12. The method of claim 11, further comprising performing, by the plurality of mobile nodes, layer 2 (L2) handover and then setting respective IP addresses of the plurality of mobile nodes to the candidate care-of-addresses received from the handover control system.

13. The method of claim 11, further comprising:
generating, by the handover control system, the candidate care-of-addresses in a candidate care-of-address table; and
determining whether the candidate care-of-addresses are duplicates corresponding to the searched plurality of target routers,
wherein the candidate care-of-address table comprises at least one element selected from a group consisting of Media Access Control (MAC) Addresses of the plurality of mobile nodes, identities (IDs) of the plurality of base stations having a highest probability of handover for the at least one of the plurality of mobile nodes, the candidate care-of-addresses, collided care-of-addresses, and entry expiration times.

14. The method of claim 13, wherein the generating and the determining comprise:
sending, by the handover control system, a duplicate-address detection (DAD) request message comprising the candidate care-of-addresses to each of the plurality of target routers;
transmitting, by each of the plurality of target routers, a neighbor solicitation message for the candidate care-of-addresses to a plurality of base stations associated with the plurality of routers and a DAD response message for the candidate care-of-addresses to the handover control system; and
determining, by the plurality of target routers, whether the candidate care-of-addresses are duplicates based on whether neighbor advertisement messages are received from the plurality of base stations.

15. The method of claim 14, wherein the determining, by the plurality of target routers, comprises:
determining, by the plurality of target routers, that the candidate care-of-addresses are duplicates upon receiving the neighbor advertisement messages during a period of time.

16. The method of claim 14, further comprising, upon determining that a candidate care-of-address is a duplicate, combining, by at least one of the plurality of target routers, a prefix of the at least one of the plurality of target routers with an arbitrary IP address to regenerate the candidate care-of-address and to send the regenerated candidate care-of-address to the handover control system.

17. The method of claim 14, further comprising:
deleting, by the handover control system, one of the candidate care-of-addresses from the candidate care-of-address table in response to not receiving the DAD request message for the one of the candidate care-of-addresses within a corresponding entry expiration time.

18. The method of claim 9, wherein the producing comprises:
generating a handover topology map indicating coverage areas supported by the plurality of base stations for each mobile Internet protocol (MIP) version.

19. The method of claim 18, wherein searching for the plurality of target routers comprises:
checking an MIP version supported by the at least one of the plurality of mobile nodes and a current location of the at least one of the plurality of mobile nodes; and
mapping the current location of the at least one of the plurality of mobile nodes to a handover topology map corresponding to the MIP version supported by the plurality of mobile nodes to search for the plurality of target routers.

20. A mobile Internet protocol (MIP) network, comprising:
a plurality of mobile nodes to provide data service to a plurality of users; and
a plurality of routers and a handover control system, the plurality of routers being configured to provide data service to at least one of the plurality of mobile nodes in coverage areas supported by a plurality of base stations managed by the plurality of routers, and to periodically report, to a handover control system, state information of the plurality of base stations and the plurality of routers, the handover control system being configured to receive the state information of the plurality of base stations and the plurality of routers to produce a handover topology map, to map a current location of the at least one of the plurality of mobile nodes to the handover topology map, to search for a plurality of target routers having a highest probability of handover for the at least one of the plurality of mobile nodes, and to transmit the state information of the searched plurality of target routers to the at least one of the plurality of mobile nodes.

* * * * *